US010560420B2

(12) United States Patent
Nomura et al.

(10) Patent No.: US 10,560,420 B2
(45) Date of Patent: *Feb. 11, 2020

(54) POSTING CONTENT TO SOCIAL MEDIUM

(71) Applicant: International Business Machines Corporation, Armonk, NY (US)

(72) Inventors: Yuka Nomura, Tokyo (JP); Koichi Takahashi, Sagamihara (JP); Takashi Takahashi, Tokyo (JP); Daisuke Tomoda, Yokohama (JP); Hiroki Yoshinaga, Urayasu (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,449

(22) Filed: Apr. 30, 2018

(65) Prior Publication Data
US 2018/0248839 A1   Aug. 30, 2018

Related U.S. Application Data

(63) Continuation of application No. 15/390,313, filed on Dec. 23, 2016, now Pat. No. 9,985,924, which is a
(Continued)

(51) Int. Cl.
*G06F 15/16* (2006.01)
*H04L 12/58* (2006.01)
*H04L 29/08* (2006.01)

(52) U.S. Cl.
CPC .............. *H04L 51/32* (2013.01); *H04L 51/20* (2013.01); *H04L 67/10* (2013.01)

(58) Field of Classification Search
CPC ................................ H04L 51/32; H04L 67/10
See application file for complete search history.

(56) References Cited

U.S. PATENT DOCUMENTS

| 8,793,319 | B2  |    7/2014 | Turski et al. |
| 8,856,232 | B1* | 10/2014 | Swerdlow .............. G06Q 10/10 |
|           |     |           | 709/204 |

(Continued)

FOREIGN PATENT DOCUMENTS

| JP | 2003110716 A | 4/2003 |
| JP | 2009265771 A | 11/2009 |

(Continued)

OTHER PUBLICATIONS

Nomura et al., "Posting Content to Social Medium," JP Patent Application 2014-198116, Filed Sep. 29, 2014.
(Continued)

*Primary Examiner* — Yves Dalencourt
(74) *Attorney, Agent, or Firm* — Brian D. Welle

(57) ABSTRACT

A computer-implemented method of posting content to a social medium comprises receiving content posted by a user along with an associated posting time which indicates when the user selected an option to post the content to the social medium; determining that publication of the content posted by the user is dependent on a trigger; and in response to determining that publication of the content is dependent on the trigger, storing the content with the associated posting time and suspending publication of the content until the trigger is satisfied such that the posting time published with the content indicates a time prior to transmission of the content from an electronic device to a server for publishing.

8 Claims, 13 Drawing Sheets

Related U.S. Application Data continuation of application No. 14/843,204, filed on Sep. 2, 2015, now Pat. No. 9,961,038.

(56) References Cited

U.S. PATENT DOCUMENTS

| | | | |
|---|---|---|---|
| 9,392,049 B2 * | 7/2016 | Ennis | H04L 67/1002 |
| 9,961,038 B2 * | 5/2018 | Nomura | H04L 51/32 |
| 9,985,924 B2 * | 5/2018 | Nomura | H04L 51/32 |
| 2009/0054043 A1 | 2/2009 | Hamilton et al. | |
| 2013/0304727 A1 | 11/2013 | Poon | |
| 2014/0012932 A1 | 1/2014 | Sharaf et al. | |
| 2014/0330912 A1 | 11/2014 | Mizuki et al. | |
| 2015/0113070 A1 | 4/2015 | Li | |

FOREIGN PATENT DOCUMENTS

| | | |
|---|---|---|
| JP | 2010263621 A | 11/2010 |
| JP | 2012032903 A | 2/2012 |
| JP | 2013090141 A | 5/2013 |
| JP | 2013175882 A | 9/2013 |
| JP | 2013190847 A | 9/2013 |
| JP | 2014049048 A | 3/2014 |
| JP | 2014135024 A | 7/2014 |
| WO | 2013190697 A1 | 12/2013 |

OTHER PUBLICATIONS

Decision to Grant a Patent, JP Patent Application No. 2014-198116, dated Jul. 5, 2016.

Notification of Reasons for Refusal, JP Patent Application No. 2014-198116, dated Apr. 26, 2016, 11 pages.

Homura et al., "Posting Content to Social Medium," U.S. Appl. No. 14/843,204, filed Sep. 2, 2015.

Homura et al., "Posting Content to Social Medium," U.S. Appl. No. 15/390,313, filed Dec. 23, 2016.

Homura et al., "Posting Content to Social Medium," U.S. Appl. No. 15/935,653, filed Mar. 26, 2018.

List of IBM Patents or Patent Applications Treated as Related, Signed Apr. 30, 2018, 2 pages.

* cited by examiner

POSTING CONTENT TO SOCIAL MEDIUM

BACKGROUND

Social media, which are media to be formed with information transmitted by users, have emerged one after another on the Internet. Social media include, for example, a social networking service (SNS), a blog, a message board, an FAQ site, a moving or still image posting/sharing site, and a word-of-mouth site.

Development of social media and maintenance of communication environments have enabled content (for example, a message, a picture, a moving image, or a combination thereof) to be posted in real time. A user at a travel destination, for example, who wants to publish content to a social medium so that a location and date and time of his/her actual visit can be seen, tends to post the content one at a time to the social medium.

SUMMARY

In one embodiment, a computer-implemented method of posting content to a social medium is provided. The method comprises receiving content posted by a user along with an associated posting time which indicates when the user selected an option to post the content to the social medium; determining that publication of the content posted by the user is dependent on a trigger; and in response to determining that publication of the content is dependent on the trigger, storing the content with the associated posting time and suspending publication of the content until the trigger is satisfied such that the posting time published with the content indicates a time prior to transmission of the content from an electronic device to a server for publishing.

DETAILED DESCRIPTION

Figure 1A:
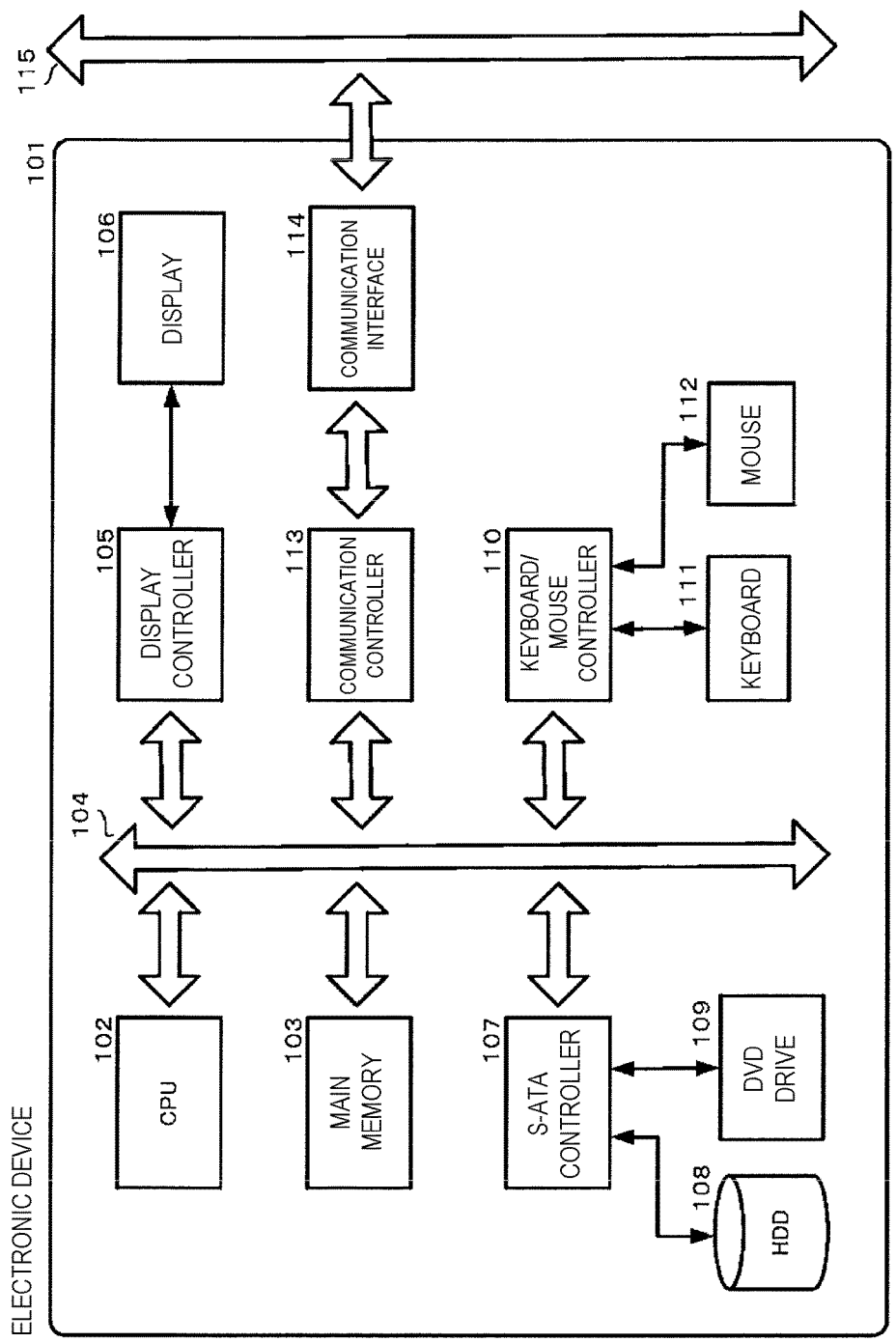
FIG. 1A is a diagram illustrating one embodiment of an example of a client device (electronic device)

Due to the nature of the social medium, the content posted to the social medium is unintentionally in a state of being browsable by an unspecified large number of people. The posted content may, however, include position information on the user (who is a poster), or content suggesting the position information.

A malicious third party may browse the content to know the user's absence from the user's home or office. In such a case, the malicious third party may commit a criminal act, such as sneak thievery, knowing the user's absence through the content posted to the social medium.

In this way, the content posted to the social medium may increasingly cause damage, such as sneak thievery. Moreover, these days, a celebrity or a famous person, for example, such as an entertainer or a musician, performs posting one at a time to a social medium at a restaurant or during shopping. The posted content may, however, include the position information on the user or the content suggesting the position information, as described above. Fans or the like of the celebrity or the famous person may thus barge into a location where the celebrity or the famous person is, and consequently cause confusion. In this way, the content posted to the social medium may show the whereabouts of the celebrity or the famous person, and thereby cause trouble or confusion to the location where the celebrity or the famous person is.

As a conventional art, there is a method of manually switching between public and private content to be posted to a social medium. According to the method, however, the user needs to perform manual setting, and may thus forget to switch the setting from public to private. Also, if the setting of publication of the content has been set to private by default for safety, the user forgets to switch the setting from private to public, and the content remains unpublished.

Moreover, as a conventional art, there is a social medium that enables setting to restrict a publication range of content to be posted to the social medium, for example, to friends, friends of friends, or a specific person or list. Under the restriction, however, the social medium cannot fulfill a role as a transmitter of information to an unspecified large number of people, which is one of the purposes of the social media.

Accordingly, one benefit of the embodiments described herein is to help prevent a criminal act that may be caused through posting of content to a social medium. Moreover, another benefit of the embodiments described herein is to help prevent confusion that may be caused through the posting of the content to the social medium. Moreover, yet another benefit is to maintain the role as the transmitter of information to an unspecified large number of people, which is one of the purposes of the social media.

Aspects of the present disclosure provide a technique for posting content to a social medium. The technique may include a method of posting content to a social medium, as well as an electronic device, a program for the electronic device, and a program product for the electronic device, which are for posting the content.

Aspects of the present disclosure also provide a technique for publishing content to a social medium. The technique may include a method of publishing content to a social medium, as well as a server computer, a program for the server computer, and a program product for the server computer, which are for publishing the content.

In a first aspect a method of posting content to a social medium comprises detecting posting of content to a social medium by a user; in response to detecting that the content has been posted, determining whether publication of the posted content is enabled; and in response to the publication of the posted content having been enabled, transmitting the posted content to a server computer.

Posting date and time to be displayed when the posted content is published on the server computer may be date and time when the posted content has been posted by the user.

In one embodiment, the electronic device may further execute the method of determining whether the posted content includes information indicating shooting date and time; in response to the posted content including the information indicating the shooting date and time, enabling the user to determine whether to utilize the shooting date and time as the posting date and time for the content; and in response to the user's instruction to utilize the shooting date and time as the posting date and time for the content, setting the shooting date and time as the posting date and time for the content.

In one embodiment, determining whether the posted content includes information indicating shooting date and time includes determining that the publication is enabled, (1) in response to arrival of the user at a location designated by the user or vicinity of the designated location (hereinafter also referred to as "Trigger 1");

(2) in response to the user having left the location designated by the user or the vicinity of the designated location (hereinafter also referred to as "Trigger 2"); or (3) in response to absence of the user from the location designated by the user or the vicinity of the designated location (hereinafter also referred to as "Trigger 3").

In one embodiment, determining whether the posted content includes information indicating shooting date and time includes determining that the publication is enabled, (4) in response to predicting time until the user arrives at the location designated by the user from a current position, and the predicted time having elapsed (hereinafter also referred to as "Trigger 4");

(5) in response to reading time until the user leaves the current position, from a schedule, and the time having elapsed (hereinafter also referred to as "Trigger 5");

(6) in response to predicting the time until the user leaves the current position, and the predicted time having elapsed (hereinafter also referred to as "Trigger 6"); or (7) in response to a certain time having elapsed (hereinafter also referred to as "Trigger 7").

In one embodiment, determining whether the posted content includes information indicating shooting data and time includes determining that the publication is enabled, (8) in response to arrival of a party other than the user at the location designated by the user or the vicinity of the designated location (hereinafter also referred to as "Trigger 8"); or (9) in response to presence of the party other than the user at the location designated by the user (hereinafter also referred to as "Trigger 9").

In one embodiment, the determining whether the posted content includes information indicating shooting date and time includes determining whether the publication of the posted content to some of users of the social medium is enabled.

Moreover, in response to the publication of the posted content to the some of the users being enabled, transmitting the posted content includes attaching information allowing the publication to the some of the users, to the posted content, and transmitting the posted content with the information to the server computer. Moreover, in one embodiment, after attaching the information allowing the publication to the some of the users, to the posted content, and transmitting the posted content with the information to the server computer, the electronic device may further execute the method of determining whether the publication of the posted content to all users is enabled; and in response to the publication of the posted content to the all users being enabled, transmitting a request for the publication of the posted content to the all users, to the server computer.

In one embodiment, the electronic device may further, in response to the publication of the posted content not being enabled, store the posted content in a buffer of the electronic device.

In one embodiment, the electronic device may further, in response to the publication of the posted content not being enabled, repeatedly determine whether the publication of the posted content is enabled.

In one embodiment, the transmitting may include a block transmitting the date and time when the posted content has been posted by the user, along with the posted content.

In a second aspect a method of publishing content to a social medium and a server computer executes the method comprising receiving content posted by a user, from an electronic device; determining whether publication of the received content is enabled; and in response to the publication of the received content having been enabled, publishing the received content.

Posting date and time to be displayed when the received content is published on the server computer may be date and time when the posted content has been posted by the user on the electronic device.

In one embodiment, if the posted content includes the information indicating the shooting date and time, the posting date and time to be displayed when the received content is published on the server computer may be the shooting date and time.

In one embodiment, the determining may include determining that the publication is enabled, in response to any one of the triggers (1) to (9).

In one embodiment, the determining may include determining whether the publication of the received content to some of users of the social medium is enabled. Moreover, the publishing may include, in response to the publication of the received content to the some of the users being enabled, publishing the received content to the some of the users. Moreover, in one embodiment, the server computer may further determine whether the publication of the received content to all users is enabled; and in response to the publication of the received content to the all users being enabled, publish the received content to the all users.

In one embodiment, the server computer may further, in response to the publication of the received content not being enabled, store the received content in a buffer of the server computer.

In one embodiment, the server computer may further, in response to the publication of the received content not being enabled, repeatedly determine whether the publication of the posted content is enabled.

In one embodiment, the receiving block may include a block of receiving the date and time when the posted content has been posted by the user, along with the posted content.

In a third aspect, an electronic device for posting content to a social medium includes content posting detecting means for detecting posting of content to a social medium by a user; content publication determining means for, in response to detecting that the content has been posted, determining whether publication of the posted content is enabled; and content transmitting means for, in response to the publication of the posted content having been enabled, transmitting the posted content to a server computer.

Posting date and time to be displayed when the posted content is published on the server computer is date and time when the posted content has been posted by the user.

In one embodiment, the content publication determining means may determine whether the publication of the posted content to some of users of the social medium is enabled. If the publication of the posted content to the some of the users is enabled, the content transmitting means may attach information allowing the publication to the some of the users, to the posted content, and transmit the posted content with the information to the server computer. Moreover, in one embodiment, after attaching the information allowing the publication to the some of the users, to the posted content, and transmitting the posted content with the information to the server computer, the content publication determining means may determine whether the publication of the posted content to all users is enabled, and the content transmitting means may, in response to the publication of the posted content to the all users being enabled, transmit a request for the publication of the posted content to the all users, to the server computer.

In a fourth aspect, a server computer for publishing content to a social medium includes content receiving means for receiving content posted by a user, from an electronic device; content publication determining means for determining whether publication of the received content is enabled; and content publishing means for, in response to the publication of the received content having been enabled, publishing the received content.

Posting date and time to be displayed when the received content is published on the server computer may be date and time when the posted content has been posted by the user on the electronic device.

In one embodiment, if the posted content includes the information indicating the shooting date and time, the posting date and time to be displayed when the received content is published on the server computer may be the shooting date and time.

In one embodiment, the content publication determining means may determine whether the publication of the received content to some of users of the social medium is enabled. If the publication of the posted content to the some of the users is enabled, the content publication determining means may, in response to the publication of the received content to the some of the users being enabled, publish the received content to some of the users as above. Moreover, in one embodiment, the content publication determining means may determine whether the publication of the received content to all users is enabled, and in response to the publication of the received content to the all users being enabled, publish the received content to the all users.

In a fifth aspect, a program for an electronic device for posting content to a social medium causes the electronic device to execute each block of the method described in the first aspect.

In a sixth aspect, a program for a server computer for publishing content to a social medium causes the server computer to execute the method described in the second aspect.

Each of the program for the electronic device and the program for the server computer may be stored in any one or more computer-readable recording media, such as a flexible disk, an MO, a CD-ROM, a DVD, a BD, a hard disk device, a USB-connectable memory medium, a ROM, an MRAM, and a RAM. Each of the program for the electronic device and the program for the server computer may be downloaded from another computer connected through a communication line, for example, a server computer (which may be the same as or different from the server computer), or may be replicated from another recording medium, for storage in the recording medium. Each of the program for the electronic device and the program for the server computer may also be compressed or divided into multiple programs, and stored in a single or multiple recording media. Moreover, it should be noted that a program product for the electronic device and a program product for the server computer may also be provided in various forms, of course. Each of the program product for the electronic device and the product program for the server computer may include, for example, a storage medium having recorded the program for the electronic device or the program for the server computer, or a transmission medium for transmitting the program for the electronic device or the program for the server computer.

It should be noted that the above description does not list all features, and that a combination or a sub combination of these components may also be included in some embodiments.

Those skilled in the art may, of course, easily envision various modifications, such as combination of each hardware component of the electronic device or the server computer, with multiple machines, and allocation of functions to those machines for implementation. Such modifications are concepts that are naturally included in the embodiments. These components are, however, illustrative, and not all of the components become essential components.

Moreover, the embodiments described herein may be realized in hardware, software, or a combination of hardware and software.

Execution in the combination of hardware and software includes execution in the electronic device in which the program for the electronic device has been installed, as a typical example. In such a case, the program for the electronic device is loaded into a memory of the electronic device and is executed, and thereby the program for the electronic device controls and causes the electronic device to execute processes. The program for the electronic device may consist of an instruction group representable in any language, code, or notation. Such an instruction group enables the program for the electronic device to directly execute a specific function, or to execute processes after performance of any one or both of 1. conversion into another language, code, or notation; and 2. replication to another medium.

Similarly, the execution in the combination of hardware and software includes execution in the server computer in which the program for the server computer has been installed, as a typical example. In such a case, the program for the server computer is loaded into a memory of the server computer and is executed, and thereby the program for the server computer controls and causes the server computer to execute the processes. The program for the server computer may consist of an instruction group representable in any language, code, or notation. Such an instruction group enables the program for the server computer to directly execute a specific function, or to execute the processes after performance of any one or both of 1. conversion into another language, code, or notation; and 2. replication to another medium.

According to aspects described herein, even if the content posted to the social medium includes the position information on the user (who is the poster) or the content suggesting the position information, time when the content is published can be automatically controlled (that is, automatically published) under a specific condition. This enables reduced risk of encountering damage, such as sneak thievery, caused by the malicious third party. Moreover, this enables prevention of occurrence of the confusion even if a third party having read the content barges into a location where the user was, since the user is already absent from the location.

Moreover, according to aspects described herein, unlike the case of manually switching the setting of the publication of the content from public to private, a possible leak of information on the user's absence from the home or the office, through the user's current location or the like, can be automatically sensed and prevented.

Moreover, according to aspects described herein, unlike the case of manually switching the setting of the publication of the content from public to private, possible identification of a location where the user is, in real time through the user's current location or the like, can be automatically sensed and prevented.

Moreover, according to aspects described herein, the role as the transmitter of information to an unspecified large number of people, which is one of the purposes of the social media, can be fulfilled without limitation of the publication range.

Moreover, according to aspects described herein, since the date and time of the posting of the content to the social medium is utilized as the posting date and time to be displayed when the content is published on the server computer, even if publication date and time for the content is later than the posting date and time, the content appears to have been published on the posting date and time. This enables the content to be arranged in order of the posting, that is, in time-series order of the posting (that is, this enables the time series to be maintained), even if the publication date and time for the content is later than the posting date and time.

Aspects will be described below in accordance with the drawings. The same reference numeral denotes the same subject throughout the following figures unless otherwise specified. It should be understood that the embodiments are provided to describe aspects and is not intended to limit the scope of the embodiments to that set forth herein.

Terms used in describing the embodiments will be described below.

"Social medium" refers to a medium to be formed with information transmitted by users on the Internet. The social medium may be, for example, but not limited to, a social networking service (SNS), a moving or still image posting/sharing site, a blog, a message board, an FAQ site, or a word-of-mouth site. The social networking service (SNS) can be, for example, Twitter®, Facebook®, Foursquare®, or LINE®. The moving or still image posting/sharing site can be, for example, Instagram®.

"Content" refers to a message, a still image (for example, a picture, an illustration), a moving image, audio, position information, a URL, friend information, or a combination thereof.

The message may be, for example, in a text format, an HTML format, or any other format. The message may arbitrarily include a word that enables identification of a location or suggests the location.

The picture may be stored as picture data, for example, in a JPEG format, a PNG format, a GIF format, a BMP format, a TIFF format, or any other format. The picture may arbitrarily include a background (for example, a building, a scene, a name of a place, characters) that enables identification of a location or suggests the location. The picture may also arbitrarily include embedded geographical information (for example, GPS information) that enables identification of a location or suggests the location.

The moving image may be stored as moving image data, for example, in an MPEG format, an MP4 format, an AVI format, a MOV format, an ASF format, or any other format. The moving image may arbitrarily include a background (for example, a building, a scene, a name of a place, characters) or audio that enables identification of a location or suggests the location. The moving image data may also arbitrarily include embedded geographical information (for example, GPS information) that enables identification of a location or suggests the location.

The audio may be, for example, in a WAV format, an AIFF format, a BWF format, or any other format. The audio may arbitrarily include a sound (for example, speech of a name of a place, an announcement) that enables identification of a location or suggests the location.

The position information may be data obtained from Wi-Fi, GPS, a mobile telephone base station (3G, 4G), or a combination thereof, for example.

The URL may be, for example, a position information URL, a URL indicating a current position of an electronic device on a map, or a URL indicating information associated with whereabouts. The position information URL is a format for representing the position information as http (URL), and may be, for example, Mobile Office Promotion Association (MOPA) position information URL. The URL indicating the current position of the electronic device on the map may be, for example, a URL indicating position information identified by a mobile telephone number, for example. The URL indicating the information associated with the whereabouts may be, for example, a URL of a restaurant or commercial facilities, for example. The friend information may be, for example, data included in a friend list.

Figure 1B:
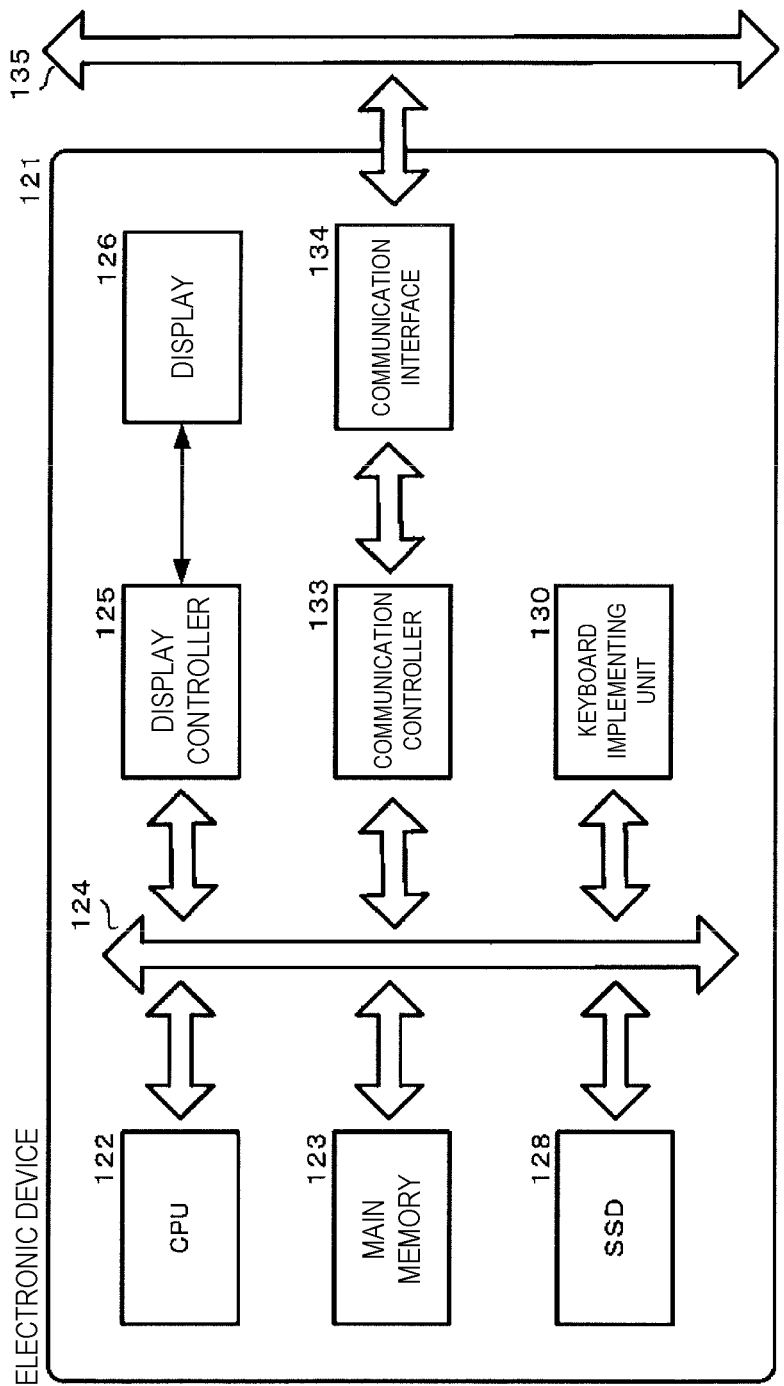
FIG. 1B is a diagram illustrating another embodiment of an example of the client device (electronic device)

FIGS. 1A and 1B are diagrams illustrating examples of a client device (electronic device). FIG. 1A is a diagram illustrating an example of the electronic device (for example, a notebook, an ultrabook).

An electronic device (101) includes one or more CPUs (102) and a main memory (103), which are connected to a bus (104). The CPU (102) is based on 32-bit or 64-bit architecture. The CPU (102) may be, for example, Core™ i series, Core™ 2 series, Atom™ series, Xeon® series, Pentium® series, or Celeron® series from Intel Corporation; A series, Phenom™ series, Athlon™ series, Turion™ series, or Sempron™ from AMD (Advanced Micro Devices), Inc.; or Power™ series from International Business Machines Corporation.

The bus (104) may be connected to a display (106), for example, a liquid crystal display (LCD), via a display controller (105). Moreover, the liquid crystal display (LCD) may be, for example, a touch panel display or a floating touch display. The display (106) may be used to display objects with a suitable graphic interface, and the objects are displayed through operations of software running on the electronic device (101) (for example, a program for the electronic device, or any various programs for the electronic device (for example, any various computer programs) running on the electronic device (101)). Moreover, the display (106) may output a screen of, for example, an application for posting content to a social medium, for example, a web browser application.

The bus (104) may optionally be connected to a disk (108), for example, a hard disk or a solid-state drive (SSD), via a SATA or IDE controller (107), for example. The bus (104) may optionally be connected to a drive (109), for example, a CD, DVD or BD drive, via the SATA or IDE controller (107), for example. The bus (104) may optionally be connected to a keyboard (111) and a mouse (112) via a peripheral device controller (110), for example, via a keyboard/mouse controller or a USB bus.

In the disk (108), programs for providing an operating system, for example, such as Windows®, MacOS®, Android®, UNIX®, and Linux®, a Java® processing environment such as J2EE, a Java® application, a Java® virtual machine (VM), and a Java® Just-In-Time (JIT) compiler; a computer program according to aspects of the disclosure; and other programs, as well as data may be stored so as to be loadable in the main memory (103).

The disk (108) may be included within the electronic device (101), may be connected through a cable so as to be accessible by the electronic device (101), or may be connected via a wired or wireless network so as to be accessible by the electronic device (101).

The drive (109) may be used to install a program, for example, the operating system, an application, or the program for the electronic device according to aspects of the disclosure, from a CD-ROM, a DVD-ROM or a BD into the disk (108), as necessary.

A communication interface (114) complies with the Ethernet® protocol, for example. The communication interface (114) is connected to the bus (104) via a communication controller (113) and responsible for wired or wireless connection of the electronic device (101) to a communication line (115), and provides a network interface layer for the TCP/IP communication protocol for a communication function of the operating system of the electronic device (101). It should be noted that the communication line may be, for example, a wireless LAN environment based on wireless LAN connection standards, a Wi-Fi wireless LAN environment, such as IEEE 802.11a/b/g/n, or a mobile telephone network environment (for example, a 3G, LTE, or 4G environment).

FIG. 1B is a diagram illustrating an example of the electronic device (which may be, for example, a smartphone, a phablet, a tablet terminal, an electronic book reader, a mobile telephone, or a navigation device (for example, a portable navigation device)).

A CPU (122), a main memory (123), a bus (124), a display controller (125), a display (126), an SSD (128), a communication controller (133), a communication interface (134), and a communication line (135) of an electronic device (121) illustrated in FIG. 1B may correspond to the CPU (102), the main memory (103), the bus (104), the display controller (105), the display (106), the disk (108), the communication controller (113), the communication interface (114), and the communication line (115) of the electronic device (101) illustrated in FIG. 1A, respectively.

If the electronic device (121) is the smartphone, the phablet, the tablet terminal, the electronic book reader, the mobile telephone, the navigation device, or the like, the CPU (122) may be, for example, various CPUs for the tablet terminal, the smartphone, the electronic book reader, or the mobile telephone, or A series from Apple Inc.®

In the SSD (128) disk, for example, programs for providing an OS for the smartphone, the phablet, the tablet terminal, the electronic book reader, the mobile telephone, the navigation device, or the like (for example, Android®, FireOS, Windows® or Windows® PhoneOS, or iOS), the Java® processing environment such as J2EE, the Java® application, the Java® virtual machine (VM), and the Java® Just-In-Time (JIT) compiler; the program for the electronic device according to aspects of the disclosure; and other programs, as well as data may be stored so as to be loadable in the main memory (123).

A keyboard implementing unit (130) may display a software keyboard on the display (126), as one of apps. It should be understood that, hereinafter, reference to the electronic device (121) may refer to the electronic device (101) illustrated in FIG. 1A, instead of the electronic device (121) illustrated in FIG. 1B.

Figure 2:
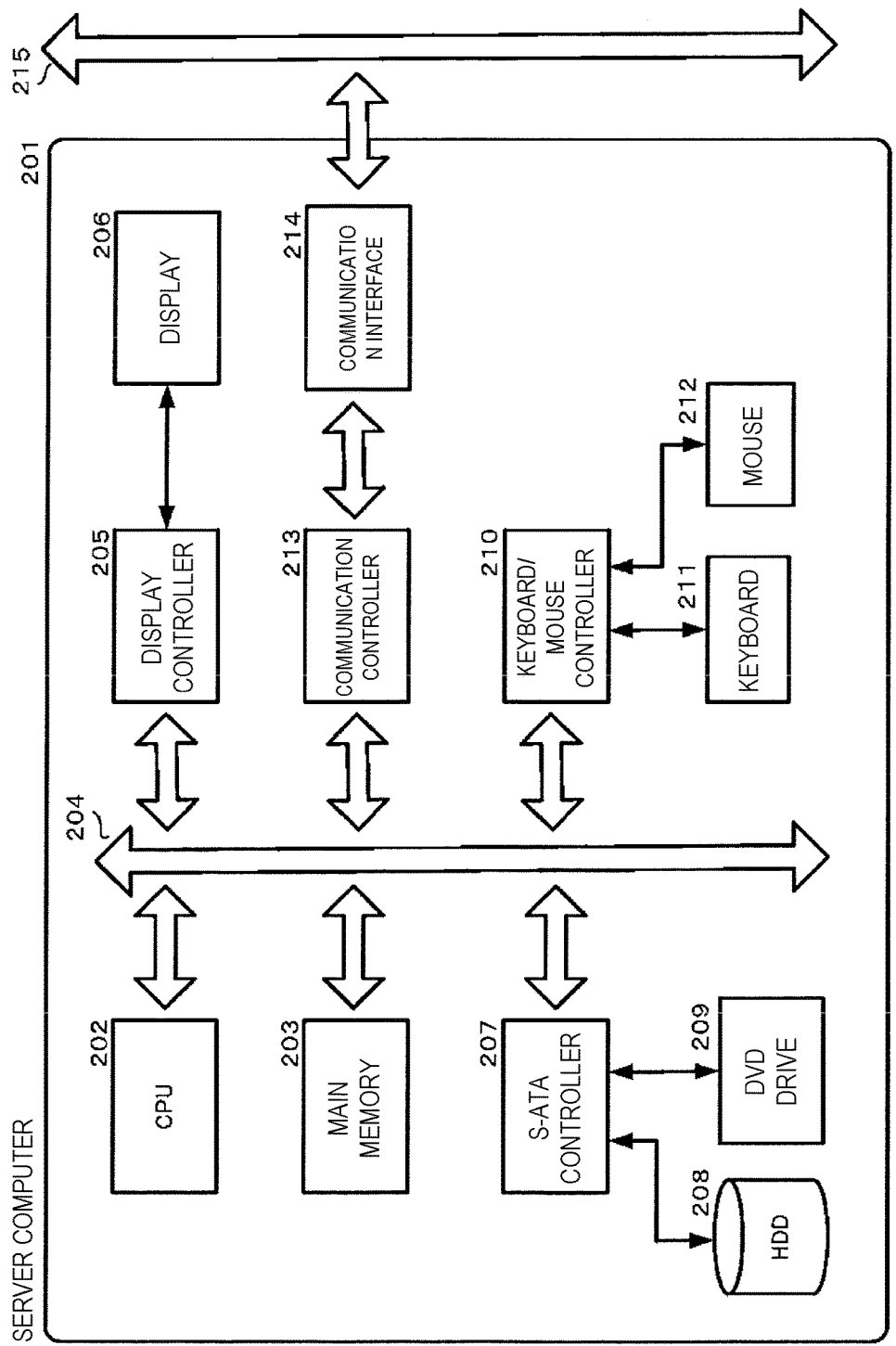
FIG. 2 is a diagram illustrating one embodiment of an example of a server device (server computer)

FIG. 2 is a diagram illustrating an example of a server computer (for example, a computer including a server function). A server computer (201) may be configured as a general purpose computer device, for example, such as a workstation, a rack mountable server, a blade server, a midrange, and a mainframe.

The server computer (201) includes one or more CPUs (202) and a main memory (203), which are connected to a bus (204). The CPU (202) is based on the 32-bit or 64-bit architecture. The CPU (202) may be, for example, Xeon® series, Core™ i series, Core™ 2 series, Pentium® series, Celeron® series, or Atom™ series from Intel Corporation; Opteron™ series, A series, Phenom™ series, Athlon™ series, Turion® series, or Sempron™ from AMD (Advanced Micro Devices), Inc.; or Power™ series from International Business Machines Corporation.

The main memory (203), the bus (204), a display controller (205), a display (206), a SATA or IDE controller (207), a disk (208), a drive (209), a peripheral device controller (210), a keyboard (211), a mouse (212), a communication controller (213), a communication interface (214), and a communication line (215) of the server computer (201) illustrated in FIG. 2 may correspond to the main memory (103), the bus (104), the display controller (105), the display (106), the SATA or IDE controller (107), the disk (108), the drive (109), the peripheral device controller (110), the keyboard (111), the mouse (112), the communication controller (113), the communication interface (114), and the communication line (115) of the electronic device (101) illustrated in FIG. 1A, respectively.

Moreover, the server computer (201) can run one or more virtual machines with the same or different OS (for example, Windows®, UNIX®, Linux®) as a guest OS, on a hypervisor (also referred to as "virtualization monitor" or "virtualization OS"), which is virtualization software (for example, VMWare®, Hyper-V®, Xen®).

Figure 3:
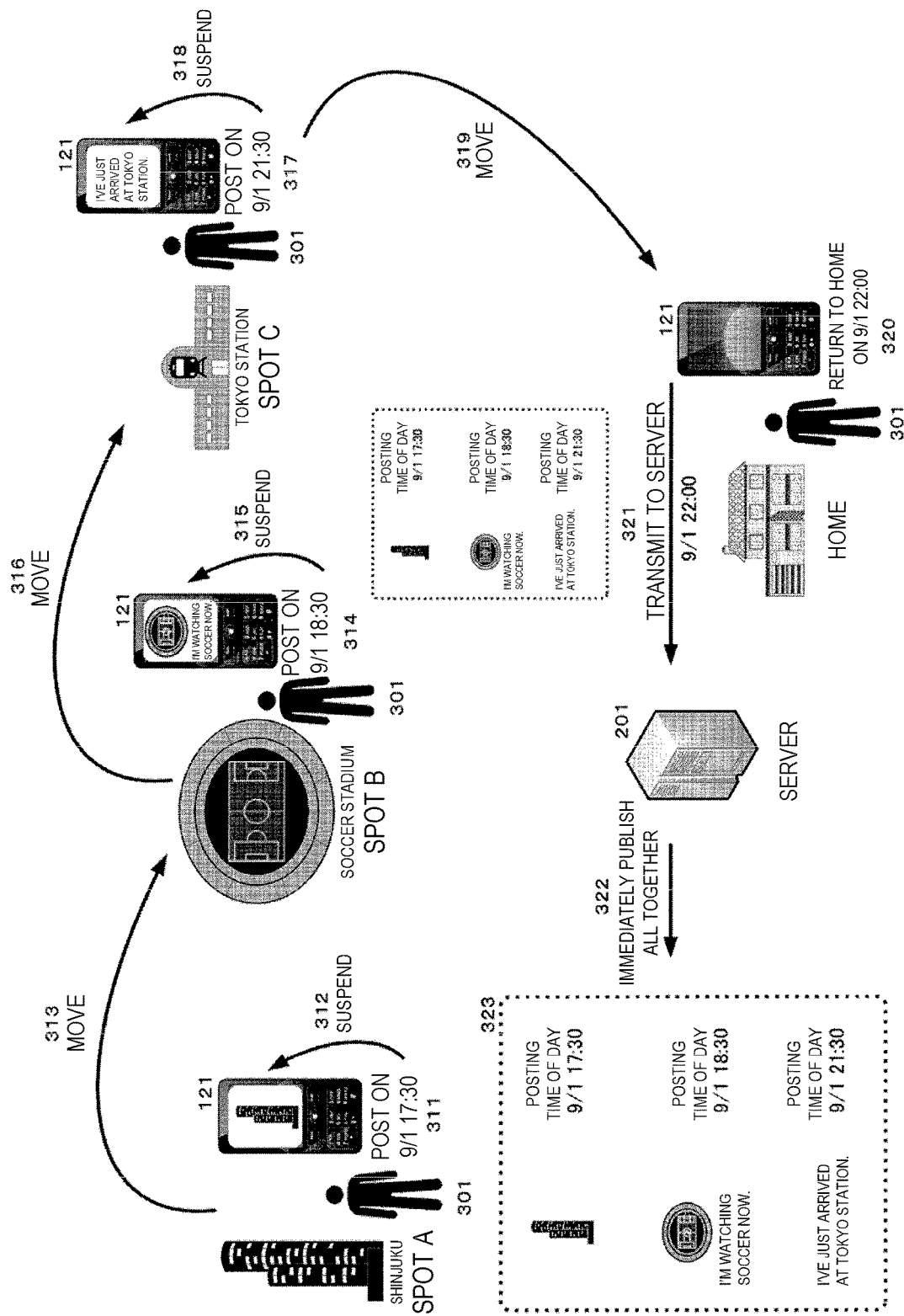
FIG. 3 depicts one embodiment of an example of posting of content to a social medium and publication of the content and illustrates an aspect in which the electronic device determines whether the publication of the posted content is enabled.

FIGS. 3 to 8 illustrate examples of posting of content to a social medium and publication of the content, respectively. FIG. 3 is an example of the posting of the content to the social medium and the publication of the content, and illustrates an aspect in which the electronic device (121) determines whether the publication of the posted content is enabled.

A user (301) is assumed to be carrying the electronic device (121) (for example, the smartphone). The user (301) is assumed to have selected a trigger option for temporarily suspending the posting of the content to the social medium if the electronic device (121) is not located at a home of the user (301) or in the vicinity of the home (for example, at a distance from which the user (301) arrives at the home within five minutes' walk).

The user (301) has shot a still image of a tower building at Spot A, using a camera function of the electronic device (121). The user (301) has then posted the shot still image from the electronic device (121) to the social medium at 17:30 on Sep. 1, 2014 (block 311). The posting is performed through pressing a post button displayed on a screen of the electronic device (121) (the same applies to the followings).

In response to detection of the still image having been posted, the electronic device (121) obtains a current position of the electronic device (121), for example, using a GPS function of the electronic device (121), in order to determine whether the still image may be uploaded to the social medium for publication. The electronic device (121) determines whether the current position of the electronic device (121) is located either at the home of the user (301) or in the vicinity of the home, based on information on the obtained position. In response to the current position of the electronic device (121) being located neither at the home of the user (301) nor in the vicinity of the home, the electronic device (121) temporarily suspends the upload of the posted still image to the social medium, and stores the posted still image in the memory (123) or the storage medium (128) of the electronic device (121) (block 312). Accordingly, the still image posted by the user (301) is not published on the social medium in real time in response to the posting by the user (301). The electronic device (121) stores "17:30 on Sep. 1, 2014," which is the time of day of the posting by the user (301), in association with the stored still image.

The user (301) is moving from Spot A to Spot B (block 313). The electronic device (121) obtains the current position of the electronic device (121), for example, using the GPS function, for example, at predetermined intervals. The electronic device (121) then determines whether the current position of the electronic device (121) is located either at the home of the user (301) or in the vicinity of the home, based on the obtained position information. In response to the current position of the electronic device (121) being neither at the home of the user (301) nor in the vicinity of the home, the electronic device (121) continues the suspension (block 312).

The user (301) has moved from Spot A to Spot B. The user (301) has shot a goal moment in a soccer game as a moving image at Spot B, using a video function of the electronic device (121). The user (301) has then entered a message "I'm watching soccer now." and posted the moving image along with the message to the social medium at 18:30 on Sep. 1, 2014 (block 314).

In response to detection of the message and the moving image having been posted, the electronic device (121) obtains the current position of the electronic device (121), for example, using the GPS function, in order to determine whether the message and the moving image may be uploaded to the social medium for publication. The electronic device (121) determines whether the current position of the electronic device (121) is located either at the home of the user (301) or in the vicinity of the home, based on the obtained position information. In response to the current position of the electronic device (121) being located neither at the home of the user (301) nor in the vicinity of the home, the electronic device (121) temporarily suspends the upload of the posted message and the posted moving image to the social medium, and stores the posted message and the posted moving image in the memory (123) or the storage medium (128) of the electronic device (121) (block 315). Accordingly, the message and the moving image posted by the user (301) are not published on the social medium in real time in response to the posting by the user (301). The electronic device (121) stores "18:30 on Sep. 1, 2014" which is the time of day of the posting by the user (301), in association with the stored message and the stored moving image.

The user (301) has finished watching the soccer game, and is moving from Spot B to Spot C (block 316). The electronic device (121) obtains the current position of the electronic device (121), for example, using the GPS function, for example, at predetermined intervals. The electronic device (121) then determines whether the current position of the electronic device (121) is located either at the home of the user (301) or in the vicinity of the home, based on the obtained position information. In response to the current position of the electronic device (121) being located neither at the home of the user (301) nor in the vicinity of the home, the electronic device (121) continues the suspension (blocks 312 and 315).

The user (301) has finished watching the soccer game, and has moved from Spot B to Spot C. The user (301) has entered a message "I've just arrived at Tokyo station." and posted the message to the social medium at 21:30 on Sep. 1, 2014 at Spot C (block 317).

In response to detection of the message having been posted, the electronic device (121) obtains the current position of the electronic device (121), for example, using the GPS function, in order to determine whether the message may be uploaded to the social medium for publication. The electronic device (121) determines whether the current position of the electronic device (121) is located either at the home of the user (301) or in the vicinity of the home, based on the obtained position information. In response to the current position of the electronic device (121) being located neither at the home of the user (301) nor in the vicinity of the home, the electronic device (121) temporarily suspends the upload of the posted message to the social medium, and stores the posted message in the memory (123) or the storage medium (128) of the electronic device (121) (block 318). Accordingly, the message posted by the user (301) is not published on the social medium in real time in response to the posting by the user (301). The electronic device (121)

stores "21:30 on Sep. 1, 2014" which is the time of day of the posting by the user (301), in association with the stored message.

The user (301) is moving from Spot C to the home (block 319). The electronic device (121) obtains the current position of the electronic device (121), for example, using the GPS function, for example, at predetermined intervals. The electronic device (121) then determines whether the current position of the electronic device (121) is located either at the home of the user (301) or in the vicinity of the home, based on the obtained position information. In response to the current position of the electronic device (121) being located neither at the home of the user (301) nor in the vicinity of the home, the electronic device (121) continues the suspension (blocks 312, 315 and 318).

The user (301) has arrived at the home. In response to his/her return to the home, the user (301) has placed the electronic device (121) in a cradle for charging (block 320). In response to the placement in the cradle, the electronic device (121) has detected that the current position of the electronic device (121) is at the home of the user (301). A Near Field Communication (NFC) tag is provided in the cradle, and the electronic device (121) may detect that the current position of the electronic device (121) is at the home of the user (301), in response to detection of the NFC tag. The electronic device (121) may alternatively obtain the current position of the electronic device (121), for example, using the GPS function, in response to the placement in the cradle.

In response to the current position of the electronic device (121) being at the home of the user (301) (that is, the presence of the user (301) at the home), the electronic device (121) uploads all of the content that has been suspended (blocks 312, 315 and 318), to the server computer (201) that manages the posting of the content to the social medium, for the publication (block 321).

The server computer (201) receives all of the content that has been suspended (blocks 312, 315 and 318), from the electronic device (121). The server computer (201) then immediately publishes all of the received content to the social medium (block 322). The server computer (201) uses each posting date and time associated with each piece of the received content, as each posting date and time to be displayed when each piece of the content is published on the server computer, and publishes the posting date and time to all users. Accordingly, the server computer (201) publishes the posting date and time indicating that the still image has been posted at 17:30 on Sep. 1, 2014; publishes the posting date and time indicating that the message "I'm watching soccer now." and the moving image have been posted at 18:30 on Sep. 1, 2014; and publishes the posting date and time indicating that the message "I've just arrived at Tokyo station." has been posted at 21:30 on Sep. 1, 2014 (block 323). Accordingly, the still image, the message "I'm watching soccer now." and the moving image, as well as the message "I've just arrived at Tokyo station." are published on the social medium in order of the time of day of the posting by the user (301).

In this way, since the still image, the message "I'm watching soccer now." and the moving image, as well as the message "I've just arrived at Tokyo station." are published in response to the user (301) having returned to the home, the absence of the user (301) during such a time span is unknown to a third party, and a criminal act such as sneak thievery can thus be prevented. Moreover, since the still image, the message "I'm watching soccer now." and the moving image, as well as the message "I've just arrived at Tokyo station." are published on the social medium in order of the time of day of the posting by the user (301), the posting time of day for each piece of the content cannot be out of order.

Figure 4:
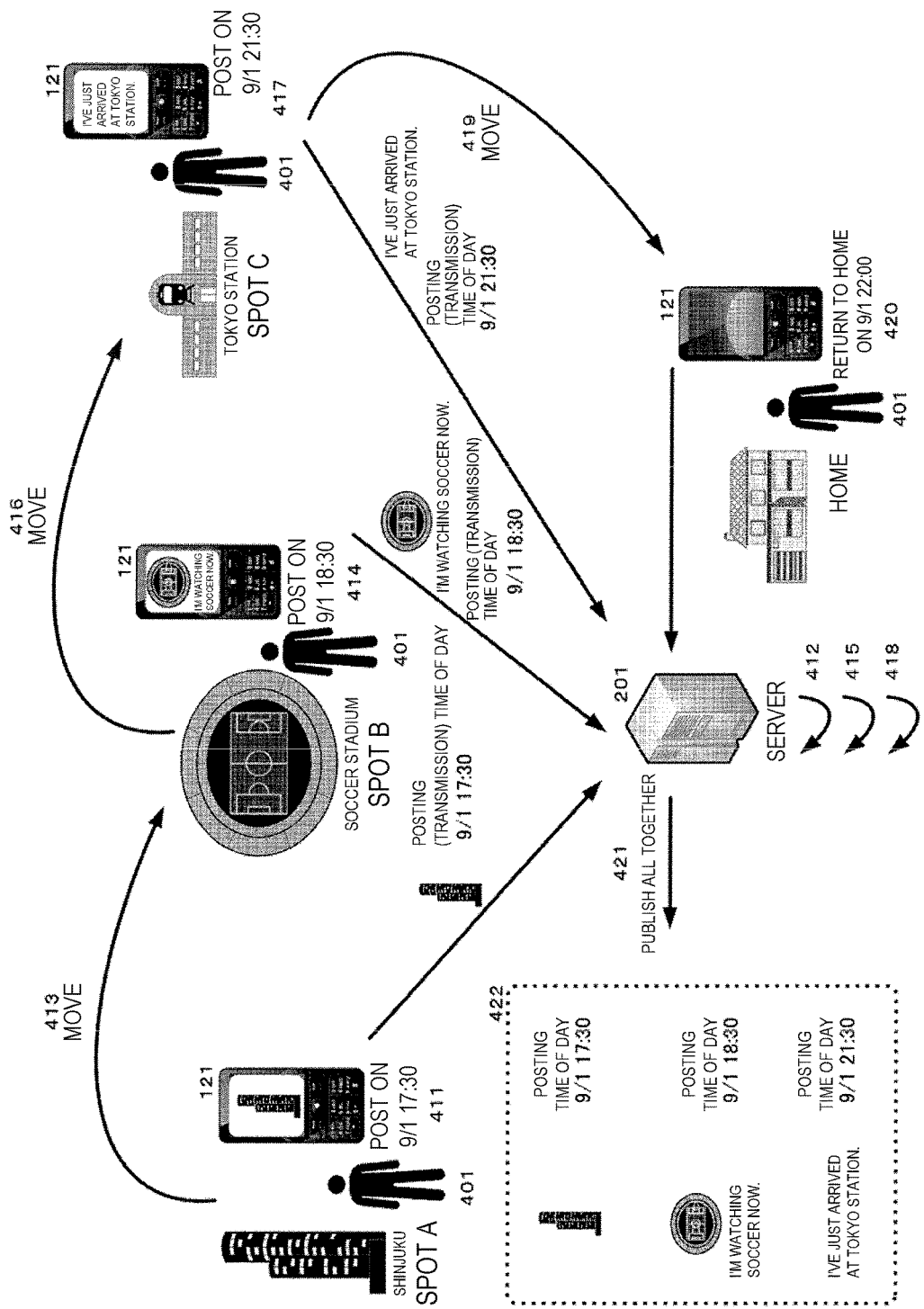
FIG. 4 is another example of posting of content to a social medium and the publication of the content and illustrates an aspect in which the server computer determines whether the publication of the posted content is enabled.

FIG. 4 is an example of the posting of the content to the social medium and the publication of the content, and illustrates an aspect in which the server computer (201) determines whether the publication of the posted content is enabled.

A user (401) is assumed to be carrying the electronic device (121) (for example, the tablet terminal). The user (401) is assumed to have selected a trigger option for temporarily suspending the publication of the content to the social medium if the electronic device (121) is not located at a home of the user (401) or in the vicinity of the home (for example, at a distance within a range in which the electronic device (121) recognizes a LAN access point at the home of the user (401) or in an apartment where the home is located).

The user (401) has shot the still image of the tower building at Spot A, using the camera function of the electronic device (121). The user (401) has then posted the shot still image from the electronic device (121) to the social medium at 17:30 on Sep. 1, 2014 (block 411). The posting is performed through pressing the post button displayed on the screen of the electronic device (121) (the same applies to the followings).

In response to the detection of the still image having been posted, the electronic device (121) associates the still image with "17:30 on Sep. 1, 2014," which is time of day of the posting by the user (401), and uploads the still image associated with this posting time to the server computer (201) that manages the posting of the content to the social medium, for the publication (block 411).

The server computer (201) receives the still image from the electronic device (121). The server computer (201) then obtains the current position of the electronic device (121) from the electronic device (121) or from a server computer collecting the current position of the electronic device (121) (which may be the same as or different from the server computer (201)), in order to determine whether the received still image may be published to the social medium. The server computer (201) determines whether the current position of the electronic device (121) is located either at the home of the user (401) or in the vicinity of the home, based on the obtained position information. In response to the current position of the electronic device (121) being located neither at the home of the user (401) nor in the vicinity of the home, the server computer (201) temporarily suspends the publication of the posted still image to the social medium, and stores the posted still image in the memory (203) or the storage medium (208) of the server computer (201) (block 412). Accordingly, the still image posted by the user (401) is not published on the social medium in real time in response to the posting by the user (401).

The user (401) is moving from Spot A to Spot B (block 413). The server computer (201) obtains the current position of the electronic device (121) from the electronic device (121) or from the server computer collecting the current position of the electronic device (121), for example, at predetermined intervals. The server computer (201) then determines whether the current position of the electronic device (121) is located either at the home of the user (401) or in the vicinity of the home, based on the obtained position information. In response to the current position of the electronic device (121) being located neither at the home of the user (401) nor in the vicinity of the home, the server computer (201) continues the suspension (block 412).

The user (401) has moved from Spot A to Spot B. The user (401) has shot the goal moment in the soccer game as the moving image at Spot B, using the video function of the electronic device (121). The user (401) has then entered the message "I'm watching soccer now." and posted the moving image along with the message to the social medium at 18:30 on Sep. 1, 2014 (block 414).

In response to the detection of the message and the moving image having been posted, the electronic device (121) associates the message and the moving image with "18:30 on Sep. 1, 2014," which is the time of day of the posting by the user (401), and uploads the message and the moving image associated with this posting time to the server computer (201) that manages the posting of the content to the social medium, for the publication (block 414).

The server computer (201) receives the message and the moving image from the electronic device (121). The server computer (201) then obtains the current position of the electronic device (121) from the electronic device (121) or from the server computer collecting the current position of the electronic device (121), in order to determine whether the received message and the received moving image may be published to the social medium. The server computer (201) determines whether the current position of the electronic device (121) is located either at the home of the user (401) or in the vicinity of the home, based on the obtained position information. In response to the current position of the electronic device (121) being located neither at the home of the user (401) nor in the vicinity of the home, the server computer (201) temporarily suspends the publication of the received message and the received moving image to the social medium, and stores the received message and the received moving image in the memory (203) or the storage medium (208) of the server computer (201) (block 415). Accordingly, the message and the moving image posted by the user (401) are not published on the social medium in real time in response to the posting by the user (401).

The user (401) is moving from Spot B to Spot C (block 416). The server computer (201) obtains the current position of the electronic device (121) from the electronic device (121) or from the server computer collecting the current position of the electronic device (121), for example, at predetermined intervals. The server computer (201) then determines whether the current position of the electronic device (121) is located either at the home of the user (401) or in the vicinity of the home, based on the obtained position information. In response to the current position of the electronic device (121) being located neither at the home of the user (401) nor in the vicinity of the home, the server computer (201) continues the suspension (blocks 412 and 415).

The user (401) has finished watching the soccer game, and has moved from Spot B to Spot C. The user (401) has entered the message "I've just arrived at Tokyo station." and posted the message to the social medium at 21:30 on Sep. 1, 2014, at Spot C (block 417).

In response to the detection of the message having been posted, the electronic device (121) associates the message with "21:30 on Sep. 1, 2014," which is the time of day of the posting by the user (401), and uploads the message associated with this posting time to the server computer (201) that manages the posting of the content to the social medium, for the publication (block 417).

The server computer (201) receives the message from the electronic device (121). The server computer (201) then obtains the current position of the electronic device (121) from the electronic device (121) or from the server computer collecting the current position of the electronic device (121), in order to determine whether the received message may be published to the social medium. The server computer (201) determines whether the current position of the electronic device (121) is located either at the home of the user (401) or in the vicinity of the home, based on the obtained position information. In response to the current position of the electronic device (121) being located neither at the home of the user (401) nor in the vicinity of the home, the server computer (201) temporarily suspends the publication of the received message to the social medium, and stores the received message in the memory (203) or the storage medium (208) of the server computer (201) (block 418). Accordingly, the message posted by the user (401) is not published on the social medium in real time in response to the posting by the user (401).

The user (401) has finished watching the soccer game, and is moving from Spot B to Spot C (block 419). The server computer (201) obtains the current position of the electronic device (121) from the electronic device (121) or from the server computer collecting the current position of the electronic device (121), for example, at predetermined intervals. The server computer (201) then determines whether the current position of the electronic device (121) is located either at the home of the user (401) or in the vicinity of the home, based on the obtained position information. In response to the current position of the electronic device (121) being located neither at the home of the user (401) nor in the vicinity of the home, the server computer (201) continues the suspension (blocks 412, 415 and 418).

The user (401) has arrived at the home (block 420).

The server computer (201) has obtained the current position of the electronic device (121) from the electronic device (121) or from the server computer collecting the current position of the electronic device (121), at predetermined intervals. The server computer (201) then determines whether the current position of the electronic device (121) is located either at the home of the user (401) or in the vicinity of the home, based on the obtained position information. The server computer (201) detects that the current position of the electronic device (121) is at the home of the user (401) (that is, the user (401) has returned to the home).

In response to the current position of the electronic device (121) being at the home of the user (401) (that is, the presence of the user (401) at the home), the server computer (201) publishes all of the content that has been suspended (412, 415 and 418) (block 421). The server computer (201) uses each posting date and time associated with each piece of the content, as each posting date and time to be displayed when each piece of the content is published on the server computer, and publishes the posting date and time to all users. Accordingly, the server computer (201) publishes the posting date and time indicating that the still image has been posted at 17:30 on Sep. 1, 2014; publishes the posting date and time indicating that the message "I'm watching soccer now." and the moving image have been posted at 18:30 on Sep. 1, 2014; and publishes the posting date and time indicating that the message "I've just arrived at Tokyo station." has been posted at 21:30 on Sep. 1, 2014 (block 422). Accordingly, the still image, the message "I'm watching soccer now." and the moving image, as well as the message "I've just arrived at Tokyo station." are published on the social medium in order of the time of day of the posting by the user (401).

In this way, since the still image, the message "I'm watching soccer now." and the moving image, as well as the message "I've just arrived at Tokyo station." are published in response to the user (401) having returned to the home, the absence of the user (401) during such a time span is unknown to the third party, and the criminal act such as sneak thievery can thus be prevented. Moreover, since the still image, the message "I'm watching soccer now." and the moving image, as well as the message "I've just arrived at Tokyo station." are published on the social medium in order of the time of day of the posting by the user (401), the posting time of day for each piece of the content cannot be out of order.

Figure 5:
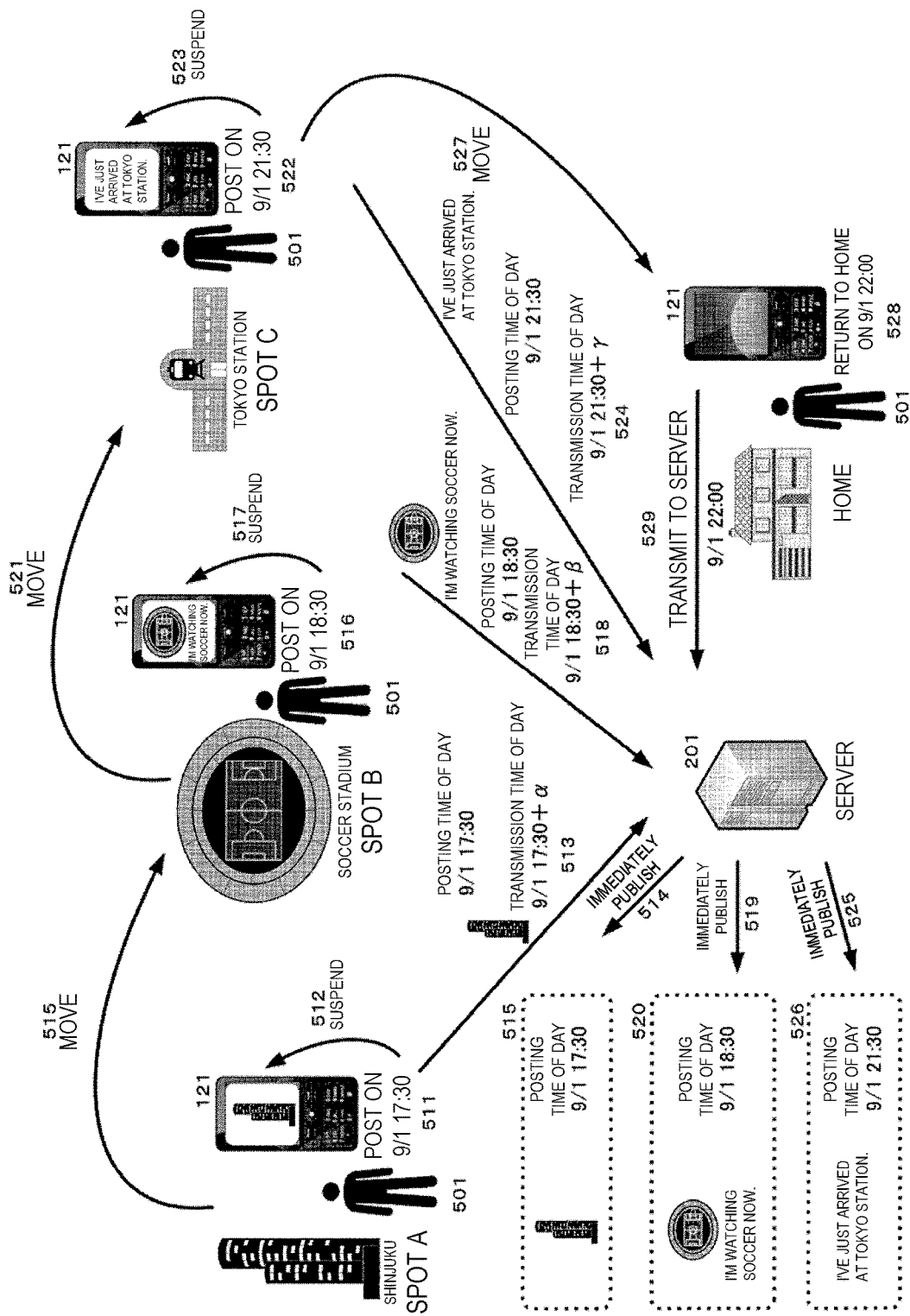
FIG. 5 is another example of the posting of content to a social medium and the publication of the content and illustrates an aspect in which the electronic device determines whether the publication of the posted content is enabled, by reading time until a user leaves a current position, from the user's schedule, and also predicting time until the user arrives at his/her home.

FIG. 5 is an example of the posting of the content to the social medium and the publication of the content, and illustrates an aspect in which the electronic device (121) determines whether the publication of the posted content is enabled, by reading time until a user (501) leaves a current position, from a schedule of the user (501), and also predicting time until the user (501) arrives at his/her home.

The user (501) is assumed to be carrying the electronic device (121) (for example, the smartphone). The user (501) is assumed to have selected a trigger option for temporarily suspending the posting of the content to the social medium if the electronic device (121) is not located at the home of the user or in the vicinity of the home (for example, at a distance within a 300 m radius from the home).

The user (501) has shot the still image of the tower building at Spot A, using the camera function of the electronic device (121). The user (501) has then posted the shot still image from the electronic device (121) to the social medium at 17:30 on Sep. 1, 2014 (block 511). The posting is performed through pressing the post button displayed on the screen of the electronic device (121) (the same applies to the followings).

In response to the detection of the still image having been posted, the electronic device (121) obtains the current position of the electronic device (121), for example, using the GPS function of the electronic device (121), in order to determine whether the still image may be uploaded to the social medium for the publication. The electronic device (121) determines whether the current position of the electronic device (121) is located either at the home of the user (501) or in the vicinity of the home, based on the obtained position information. In response to the current position of the electronic device (121) being located neither at the home of the user (501) nor in the vicinity of the home, the electronic device (121) temporarily suspends the upload of the posted still image to the social medium, and stores the posted still image in the memory (123) or the storage medium (128) of the electronic device (121) (block 512). Accordingly, the still image posted by the user (501) is not published on the social medium in real time in response to the posting by the user (501). The electronic device (121) stores "17:30 on Sep. 1, 2014," which is time of day of the posting by the user (501), in association with the stored still image.

Moreover, the electronic device (121) reads the schedule of the user (501) on Sep. 1, 2014, from a schedule management app stored in the electronic device (121). The electronic device (121) then knows that the user (501) has planned to go to watch the soccer game after this. The electronic device (121) thus knows that the suspension (block 512) needs to be continued until 21:00, which is time of the end of the soccer game, at earliest. Accordingly, the still image posted by the user (501) is not published on the social medium in real time in response to the posting by the user (501).

Moreover, the electronic device (121) may pause a process of determining whether the still image may be uploaded to the social medium for the publication, based on current position information on the electronic device (121), until 21:00, which is the time of the end of the soccer game, at earliest.

The user (501) is moving from Spot A to Spot B (block 515). The electronic device (121) obtains the current position of the electronic device (121), for example, using the GPS function, for example, at predetermined intervals. The electronic device (121) then determines whether the current position of the electronic device (121) is located either at the home of the user (501) or in the vicinity of the home, based on the obtained position information. In response to the current position of the electronic device (121) being located neither at the home of the user (501) nor in the vicinity of the home, the electronic device (121) continues the suspension (block 512). Alternatively, the electronic device (121) may stop the determination of whether the current position of the electronic device (121) is located either at the home of the user (501) or in the vicinity of the home, until time when the user (501) finishes watching the soccer.

The user (501) has moved from Spot A to Spot B. The user (501) has shot the goal moment in the soccer game as the moving image at Spot B, using the video function of the electronic device (121). The user (501) has then entered the message "I'm watching soccer now." and posted the moving image along with the message to the social medium at 18:30 on Sep. 1, 2014 (block 516).

The electronic device (121) has known from the schedule management app of the user (501) that the time of the end of the soccer game is 21:00. The electronic device (121) thus temporarily suspends the upload of the posted message and the posted moving image to the social medium, and stores the posted message and the posted moving image in the memory (123) or the storage medium (128) of the electronic device (121), until 21:00, which is the time when the user (501) finishes watching the soccer, at earliest (block 517). Accordingly, the message and the moving image posted by the user (501) are not published on the social medium in real time in response to the posting by the user (501). The electronic device (121) stores "18:30 on Sep. 1, 2014," which is the time of day of the posting by the user (501), in association with the stored message and the stored moving image.

The electronic device (121) also continues the temporary suspension of the upload of the still image (block 512), along with the temporary suspension of the upload of the message and the moving image (block 517).

The user (501) is moving from Spot B to Spot C (block 521). The electronic device (121) optionally obtains the current position of the electronic device (121), for example, using the GPS function, for example, at predetermined intervals. The electronic device (121) then determines whether the current position of the electronic device (121) is located either at the home of the user (501) or in the vicinity of the home, based on the obtained position information. In response to the current position of the electronic device (121) being located neither at the home of the user (501) nor in the vicinity of the home, the electronic device (121) continues the suspension (blocks 512 and 517). It should be noted that the electronic device (121) may pause the determination of whether the current position of the electronic device (121) is located either at the home of the user (501) or in the vicinity of the home, until 21:00, which is the time when the user (501) finishes watching the soccer.

The user (501) has finished watching the soccer game, and has moved from Spot B to Spot C. The user (501) has entered the message "I've just arrived at Tokyo station." and posted the message to the social medium at 21:30 on Sep. 1, 2014, at Spot C (block 522).

In response to the detection of the message having been posted, the electronic device (121) obtains the current position of the electronic device (121), for example, using the GPS function, in order to determine whether the message may be uploaded to the social medium for the publication. The electronic device (121) determines whether the current position of the electronic device (121) is located either at the home of the user (501) or in the vicinity of the home, based on the obtained position information. In response to the current position of the electronic device (121) being located neither at the home of the user (501) nor in the vicinity of the home, the electronic device (121) temporarily suspends the upload of the posted message to the social medium, and stores the posted message in the memory (123) or the storage medium (128) of the electronic device (121) (block 523). Accordingly, the message posted by the user (501) is not published on the social medium in real time in response to the posting by the user (501). The electronic device (121) stores "21:30 on Sep. 1, 2014," which is the time of day of the posting by the user (501), in association with the stored message.

Moreover, the electronic device (121) knows that the current position is at Tokyo station, based on the obtained position information. The electronic device (121) thus reads an electronic timetable, for example, via a network, to calculate the shortest time required to arrive at the station nearest from the home, for example. The electronic device (121) then calculates a sum of the calculated time and an average walking time from the nearest station to the home, and predicts time until the user (501) arrives at the home from Tokyo station.

For the posting of the still image for which transmission to the server computer (201) has been suspended in block 512, the electronic device (121) adds total time (a) of already elapsed time (four hours) and the predicted time, to 17:30 on Sep. 1, 2014, and plans to post the still image at the added time of day (17:30+a).

Similarly, for the posting of the message and the moving image for which transmission to the server computer (201) has been suspended in block 517, the electronic device (121) adds total time (β) of the already elapsed time (three hours) and the predicted time, to 18:30 on Sep. 1, 2014, and plans to post the message and the moving image at the added time of day (18:30+β).

Similarly, for the posting of the message for which transmission to the server computer (201) has been suspended in block 523, the electronic device (121) adds the predicted time (γ) to 21:30 on Sep. 1, 2014, and plans to post the message at the added time of day (21:30+γ).

The user (501) is moving from Spot C to the home (block 527). In response to the time of day 17:30+α having elapsed, before the user (501) returns to the home, the electronic device (121) uploads the still image temporarily suspended in block 512, to the server computer (201) (block 513). The server computer (201) immediately publishes the received still image to the social medium (block 514). The server computer (201) uses the posting date and time (17:30) associated with the received still image, as the posting date and time to be displayed when the still image is published on the server computer, and publishes the posting date and time to all users (block 515).

Similarly, in response to the time of day 18:30+β having elapsed, before the user (501) returns to the home, the electronic device (121) uploads the message and the moving image temporarily suspended in block 517, to the server computer (201) (block 518). The server computer (201) immediately publishes the received message and the received moving image to the social medium (block 519). The server computer (201) uses the posting date and time (18:30) associated with the received message and the received moving image, as the posting date and time to be displayed when the message and the moving image are published on the server computer, and publishes the posting date and time to all users (block 520).

Similarly, in response to the time of day 21:30+γ having elapsed, before the user (501) returns to the home, the electronic device (121) uploads the message temporarily suspended in block 523, to the server computer (201) (block 524). The server computer (201) publishes the received message to the social medium (block 525). The server computer (201) uses the posting date and time (21:30) associated with the received message, as the posting date and time to be displayed when the message is published on the server computer, and publishes the posting date and time to all users (block 526).

The user (501) has arrived at his/her home apartment. In response to his/her return to the home apartment, the user (501) has held the electronic device (121) close to an entrance door lock (cylinder IC lock) provided at an entrance of the apartment, for unlocking (block 528).

The electronic device (121) has communicated with the entrance door lock, and detected that the current position of the electronic device (121) is at the home of the user (501), in response to the unlocking.

In response to the current position of the electronic device (121) being at the home of the user (501) (that is, the presence of the user (501) at the home), if some or all of the suspension (blocks 512, 517 and 523) have still continued, the electronic device (121) uploads all of the content that has been continually suspended, to the server computer (201) that manages the posting of the content to the social medium, for the publication, without waiting for each of the time of day 17:30+α, 18:30+β and 21:30+γ (that is, without waiting for the elapse of each of the time α, β and γ) (block 529).

The server computer (201) receives all of the content that has been suspended (blocks 512, 517 and 523), from the electronic device (121). The server computer (201) then publishes all of the received content to the social medium (blocks 514, 519 and 525). The server computer (201) uses each posting date and time associated with each piece of the received content, as each posting date and time to be displayed when each piece of the content is published on the server computer, and publishes the posting date and time to all users. Accordingly, the server computer (201) publishes the posting date and time indicating that the still image has been posted at 17:30 on Sep. 1, 2014; publishes the posting date and time indicating that the message "I'm watching soccer now." and the moving image have been posted at 18:30 on Sep. 1, 2014; and publishes the posting date and time indicating that the message "I've just arrived at Tokyo station." has been posted at 21:30 on Sep. 1, 2014 (blocks 515, 520 and 526). Accordingly, the still image, the message "I'm watching soccer now." and the moving image, as well as the message "I've just arrived at Tokyo station." are published on the social medium in order of the time of day of the posting by the user (501).

In this way, the still image, the message "I'm watching soccer now." and the moving image, as well as the message "I've just arrived at Tokyo station." are published at earlier of: in response to prediction of time of day of the arrival of the user (501) at the home or in the vicinity of the home, and elapse of the predicted time of day; or in response to the user (501) having returned to the home. Accordingly, the absence of the user (501) during such a time span is unknown to the third party, and the criminal act such as sneak thievery can thus be prevented. Moreover, since the still image, the message "I'm watching soccer now." and the moving image, as well as the message "I've just arrived at Tokyo station." are published on the social medium in order of the time of day of the posting by the user (501), the posting time of day for each piece of the content cannot be out of order.

Figure 6:
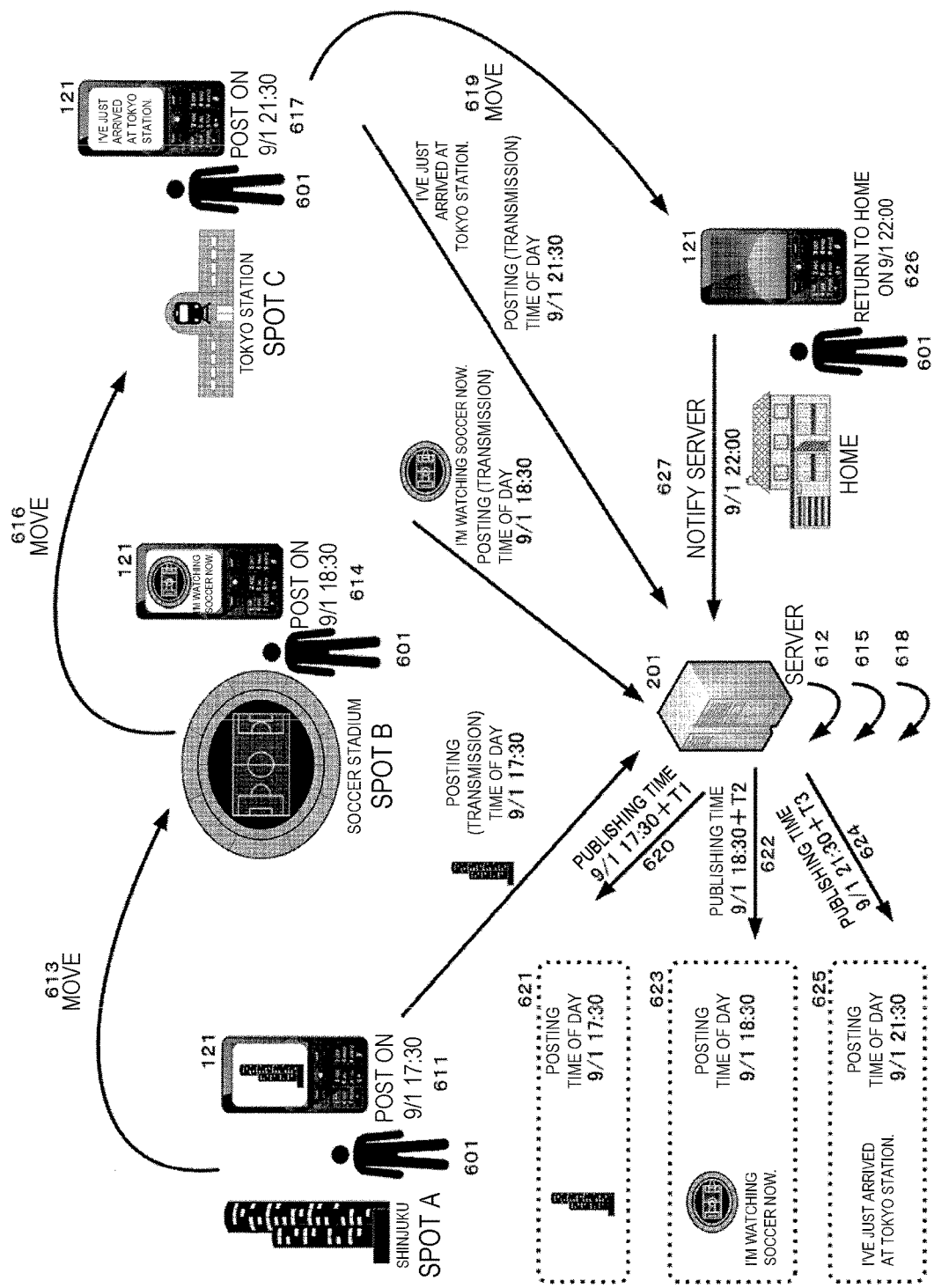
FIG. 6 is another example of the posting of content to a social medium and the publication of the content and illustrates an aspect in which the server computer determines whether the publication of the posted content is enabled, by reading the time until the user leaves the current position, from the user's schedule, and also predicting the time until the user arrives at his/her home.

FIG. 6 is an example of the posting of the content to the social medium and the publication of the content, and illustrates an aspect in which the server computer (201) determines whether the publication of the posted content is enabled, by reading time until a user (601) leaves a current position, from a schedule of the user (601), and also predicting time until the user (601) arrives at his/her home.

The user (601) is assumed to be carrying the electronic device (121) (for example, the tablet terminal). The user (601) is assumed to have selected a trigger option for temporarily suspending the publication of the content to the social medium if the electronic device (121) is not located at the home of the user (601) or in the vicinity of the home (for example, within a range in which the electronic device (121) can connect to a LAN access point at the home of the user (601) or in an apartment where the home is located).

The user (601) has shot the still image of the tower building at Spot A, using the camera function of the electronic device (121). The user (601) has then posted the shot still image from the electronic device (121) to the social medium at 17:30 on Sep. 1, 2014 (block 611). The posting is performed through pressing the post button displayed on the screen of the electronic device (121) (the same applies to the followings).

In response to the detection of the still image having been posted, the electronic device (121) associates the still image with "17:30 on Sep. 1, 2014," which is time of day of the posting by the user (601), and uploads the still image associated with this posting time to the server computer (201) that manages the posting of the content to the social medium, for the publication (block 611).

The server computer (201) receives the still image from the electronic device (121). The server computer (201) then obtains the current position of the electronic device (121) from the electronic device (121) or from the server computer collecting the current position of the electronic device (121) (which may be the same as or different from the server computer (201)), in order to determine whether the received still image may be published to the social medium. The server computer (201) determines whether the current position of the electronic device (121) is located either at the home of the user (601) or in the vicinity of the home, based on the obtained position information. In response to the current position of the electronic device (121) being located neither at the home of the user (601) nor in the vicinity of the home, the server computer (201) temporarily suspends the publication of the posted still image to the social medium, and stores the posted still image in the memory (203) or the storage medium (208) of the server computer (201) (block 612). The stored still image has been associated with "17:30 on Sep. 1, 2014," which is the time of day of the posting by the user (601). Accordingly, the still image posted by the user (601) is not published on the social medium in real time in response to the posting by the user (601).

Moreover, the server computer (201) reads the schedule of the user (601) on Sep. 1, 2014, from a server computer (which may be the same as or different from the server computer (201)) having stored schedule management data of the user (601) associated with the electronic device (121). The server computer (201) then knows that the user (601) has planned to go to watch the soccer game after this. The server computer (201) thus knows that the suspension (block 612) needs to be continued until 21:00, which is the time of the end of the soccer game, at earliest. Accordingly, the still image posted by the user (601) is not published on the social medium in real time in response to the posting by the user (601).

Moreover, the server computer (201) may pause the process of determining whether the still image may be uploaded to the social medium for the publication, based on the current position information on the electronic device (121), until 21:00, which is the time of the end of the soccer game, at earliest.

The user (601) is moving from Spot A to Spot B (block 613). The server computer (201) obtains the current position of the electronic device (121) from the electronic device (121) or from the server computer collecting the current position of the electronic device (121) (which may be the same as or different from the server computer (201)), for example, at predetermined intervals. The server computer (201) then determines whether the current position of the electronic device (121) is located either at the home of the user (601) or in the vicinity of the home, based on the obtained position information. In response to the current position of the electronic device (121) being located neither at the home of the user (601) nor in the vicinity of the home, the server computer (201) continues the suspension (block 612). Alternatively, the server computer (201) may stop the determination of whether the current position of the electronic device (121) is located either at the home of the user (601) or in the vicinity of the home, until time when the user (601) finishes watching the soccer.

The user (601) has moved from Spot A to Spot B. The user (601) has shot the goal moment in the soccer game as the moving image at Spot B, using the video function of the electronic device (121). The user (601) has then entered the message "I'm watching soccer now." and posted the moving image along with the message to the social medium at 18:30 on Sep. 1, 2014 (block 614).

In response to the detection of the message and the moving image having been posted, the electronic device (121) associates the message and the moving image with "18:30 on Sep. 1, 2014," which is the time of day of the posting by the user (601), and uploads the message and the moving image associated with this posting time to the server computer (201) that manages the posting of the content to the social medium, for the publication (block 614).

The server computer (201) has known from the schedule management data of the user (601) that the time of the end of the soccer game is 21:00. The server computer (201) thus temporarily suspends the upload of the posted message and the posted moving image to the social medium, and stores the posted message and the posted moving image in the memory (203) or the storage medium (208) of the server computer (201), until 21:00, which is the time when the user (601) finishes watching the soccer, at earliest (block 615). The stored message and the stored moving image have been associated with "18:30 on Sep. 1, 2014," which is the time of day of the posting by the user (601). Accordingly, the message and the moving image posted by the user (601) are not published on the social medium in real time in response to the posting by the user (601).

The server computer (201) also continues the temporary suspension of the upload of the still image (block 612), along with the temporary suspension of the upload of the message and the moving image (block 615).

The user (601) is moving from Spot B to Spot C (block 616). The server computer (201) optionally obtains the current position of the electronic device (121) from the electronic device (121) or from the server computer collecting the current position of the electronic device (121), for example, at predetermined intervals. The server computer (201) then determines whether the current position of the electronic device (121) is located either at the home of the user (601) or in the vicinity of the home, based on the obtained position information. In response to the current position of the electronic device (121) being located neither at the home of the user (601) nor in the vicinity of the home, the server computer (201) continues the suspension (blocks 612 and 615). It should be noted that the server computer (201) may pause the determination of whether the current position of the electronic device (121) is located either at the home of the user (601) or in the vicinity of the home, until 21:00, which is the time when the user (601) finishes watching the soccer.

The user (601) has finished watching the soccer game, and has moved from Spot B to Spot C. The user (601) has entered the message "I've just arrived at Tokyo station." and posted the message to the social medium at 21:30 on Sep. 1, 2014, at Spot C (block 617).

In response to the detection of the message having been posted, the electronic device (121) associates the message with "21:30 on Sep. 1, 2014," which is the time of day of the posting by the user (601), and uploads the message associated with this posting time to the server computer (201) that manages the posting of the content to the social medium, for the publication (block 617).

The server computer (201) receives the message from the electronic device (121). The server computer (201) then obtains the current position of the electronic device (121) from the electronic device (121) or from the server computer collecting the current position of the electronic device (121), in order to determine whether the received message may be published to the social medium. The server computer (201) determines whether the current position of the electronic device (121) is located either at the home of the user (601) or in the vicinity of the home, based on the obtained position information. In response to the current position of the electronic device (121) being located neither at the home of the user (601) nor in the vicinity of the home, the server computer (201) temporarily suspends the publication of the received message to the social medium, and stores the received message in the memory (203) or the storage medium (208) of the server computer (201) (block 618). The stored message has been associated with "21:30 on Sep. 1, 2014," which is the time of day of the posting by the user (601). Accordingly, the message posted by the user (601) is not published on the social medium in real time in response to the posting by the user (601).

Moreover, the server computer (201) knows that the current position is at Tokyo station, based on the obtained position information. The server computer (201) thus reads the electronic timetable, for example, via the network, to calculate the shortest time required to arrive at the station nearest from the home of the user (601), for example. The server computer (201) then calculates the sum of the calculated time and the average walking time from the nearest station to the home, and predicts time until the user (601) arrives at the home from Tokyo station.

For the posting of the still image for which transmission to the server computer (201) has been suspended in block 612, the server computer (201) adds total time (T1) of the already elapsed time (four hours) and the predicted time, to 17:30 on Sep. 1, 2014, and plans to post the still image at the added time of day (17:30+T1).

Similarly, for the posting of the message and the moving image for which transmission to the server computer (201) has been suspended in block 615, the server computer (201) adds total time (T2) of the already elapsed time (three hours) and the predicted time, to 18:30 on Sep. 1, 2014, and plans to post the message and the moving image at the added time of day (18:30+T2).

Similarly, for the posting of the message for which transmission to the server computer (201) has been suspended in block 618, the server computer (201) adds the predicted time (T3) to 21:30 on Sep. 1, 2014, and plans to post the message at the added time of day (21:30+T3).

The user (601) is moving from Spot C to the home (block 619). In response to the time of day 17:30+T1 having elapsed, before the user (601) returns to the home, the server computer (201) publishes the still image temporarily suspended in block 612 (block 620). The server computer (201) uses the posting date and time (17:30) associated with the published still image, as the posting date and time to be displayed when the still image is published on the server computer, and publishes the posting date and time to all users (block 621).

Similarly, in response to the time of day 18:30+T2 having elapsed, before the user (601) returns to the home, the server computer (201) publishes the message and the moving image temporarily suspended in block 615 (block 622). The server computer (201) uses the posting date and time (18:30) associated with the published message and the published moving image, as the posting date and time to be displayed when the message and the moving image are published on the server computer, and publishes the posting date and time to all users (block 623).

Similarly, in response to the time of day 21:30+T3 having elapsed, before the user (601) returns to the home, the server computer (201) publishes the message temporarily suspended in block 618 (block 624). The server computer (201) uses the posting date and time (21:30) associated with the published message, as the posting date and time to be displayed when the message is published on the server computer, and publishes the posting date and time to all users (block 625).

The user (601) has arrived at his/her home apartment. In response to his/her return to the home apartment, the user (601) has held the electronic device (121) close to the entrance door lock (cylinder IC lock) provided at the entrance of the apartment, for unlocking (block 626).

The electronic device (121) has communicated with the entrance door lock, and detected that the current position of the electronic device (121) is at the home of the user (601), in response to the unlocking. In response to the current position of the electronic device (121) being at the home of the user (601) (that is, the presence of the user (601) at the home), the electronic device (121) notifies the server computer (201) of the arrival of the user (601) at the home (block 627).

The server computer (201) knows the arrival of the user (601) at the home, from the notification from the electronic device (121).

In response to the current position of the electronic device (121) being at the home of the user (601) (that is, the presence of the user (601) at the home), if some or all of the suspension (blocks 612, 615 and 618) have still continued, the server computer (201) publishes all of the content that has been continually suspended, without waiting for each of the time of day 17:30+T1, 18:30+T2 and 21:30+T3 (that is, without waiting for the elapse of each of the time T1, T2 and T3) (blocks 620, 622 and 624). Accordingly, the server computer (201) publishes the posting date and time indicating that the still image has been posted at 17:30 on Sep. 1, 2014; publishes the posting date and time indicating that the message "I'm watching soccer now." and the moving image have been posted at 18:30 on Sep. 1, 2014; and publishes the posting date and time indicating that the message "I've just arrived at Tokyo station." has been posted at 21:30 on Sep. 1, 2014 (blocks 621, 623 and 625). Accordingly, the still image, the message "I'm watching soccer now." and the moving image, as well as the message "I've just arrived at Tokyo station." are published on the social medium in order of the time of day of the posting by the user.

In this way, the still image, the message "I'm watching soccer now." and the moving image, as well as the message "I've just arrived at Tokyo station." are published at earlier of: in response to prediction of time of day of the arrival of the user (601) at the home or in the vicinity of the home, and elapse of the predicted time of day; or in response to the user (601) having returned to the home. Accordingly, the absence of the user (601) during such a time span is unknown to the third party, and the criminal act such as sneak thievery can thus be prevented. Moreover, since the still image, the message "I'm watching soccer now." and the moving image, as well as the message "I've just arrived at Tokyo station." are published on the social medium in order of the time of day of the posting by the user (601), the posting time of day for each piece of the content cannot be out of order.

Figure 7:
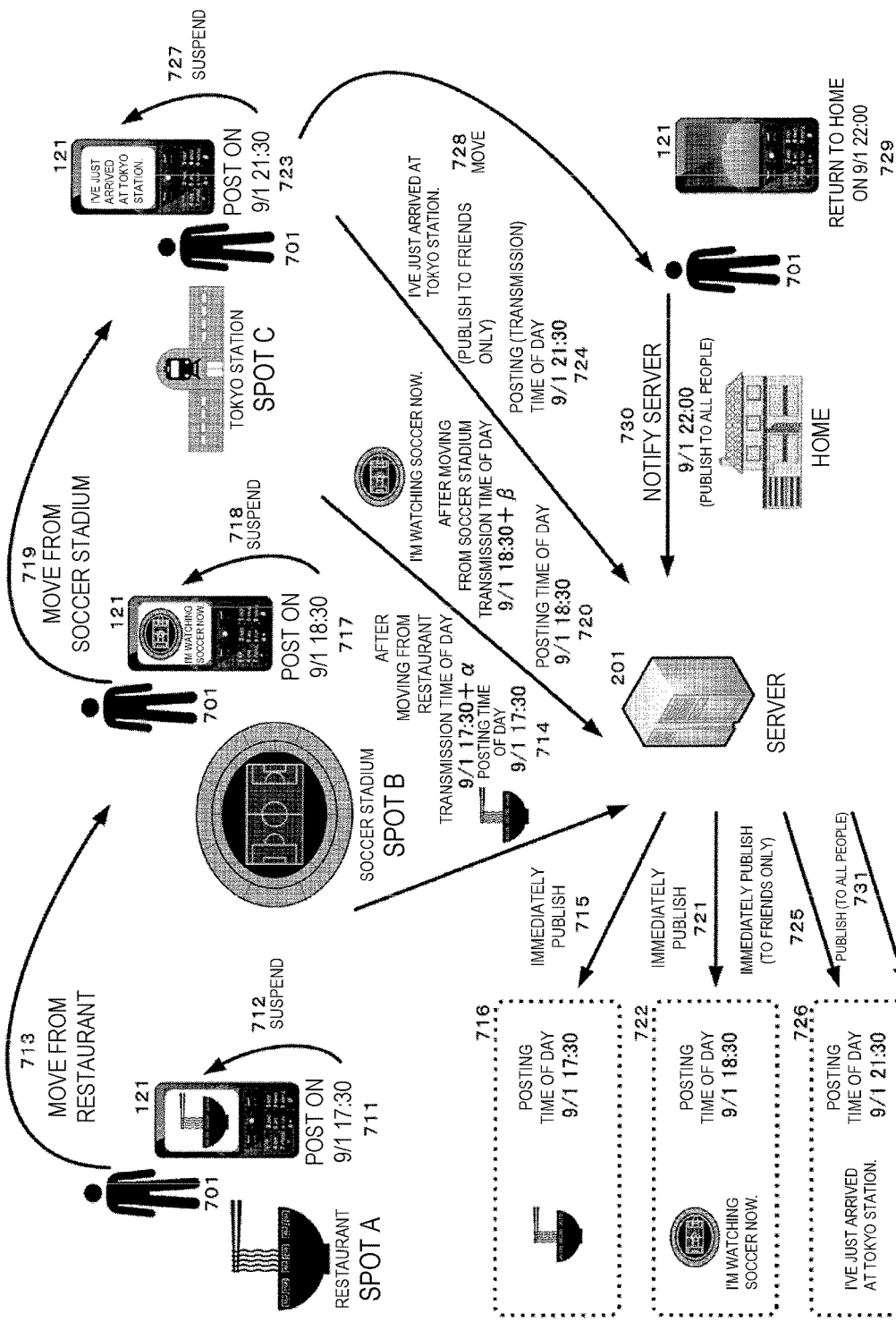
FIG. 7 is another example of the posting of content to a social medium and the publication of the content and illustrates an aspect in which the electronic device determines whether the publication of the posted content is enabled, in response to the user having left a location designated by the user.

FIG. 7 is an example of the posting of the content to the social medium and the publication of the content, and illustrates an aspect in which the electronic device (121) determines whether the publication of the posted content is enabled, in response to a user (701) having left a location designated by the user (701).

The user (701) is a celebrity who posts scenes of dining at restaurants to his/her blog and thereby attracts public attention.

The user (701) is assumed to be carrying the electronic device (121) (for example, the smartphone). The user (701) is assumed to have selected a trigger option for temporarily suspending the posting of the content to the social medium if the electronic device (121) is located at a predetermined public location or in the vicinity of the public location (for example, at a distance within 1 km around the public location). The predetermined public location is assumed to be a restaurant, a shopping mall, or a sports stadium (for example, a soccer stadium or a baseball stadium), for example.

The user (701) has shot a still image of ramen ordered at the restaurant, at Spot A, using the camera function of the electronic device (121). The user (701) has then posted the shot still image from the electronic device (121) to the social medium at 17:30 on Sep. 1, 2014 (block 711). The posting is performed through pressing the post button displayed on the screen of the electronic device (121) (the same applies to the followings).

In response to detection of the still image having been posted, the electronic device (121) obtains the current position of the electronic device (121), for example, using the GPS function of the electronic device (121), in order to determine whether the still image may be uploaded to the social medium for publication. The electronic device (121) determines whether the current position of the electronic device (121) is located either at the predetermined public location or in the vicinity of the predetermined public location, based on the obtained position information. In response to the current position of the electronic device (121) being at the restaurant, the electronic device (121) temporarily suspends the upload of the posted still image to the social medium, and stores the posted still image in the memory (123) or the storage medium (128) of the electronic device (121) (block 712). Accordingly, the still image posted by the user (701) is not published on the social medium in real time in response to the posting by the user (701). The electronic device (121) stores "17:30 on Sep. 1, 2014," which is time of day of the posting by the user (701), in association with the stored still image.

The user (701) is moving from Spot A to Spot B (block 713). The electronic device (121) obtains the current position of the electronic device (121), for example, using the GPS function, for example, at predetermined intervals. The electronic device (121) then determines whether the current position of the electronic device (121) is located either at the predetermined public location or in the vicinity of the predetermined public location, based on the obtained position information.

In response to the current position of the electronic device (121) being either at the predetermined public location or in the vicinity of the predetermined public location, the electronic device (121) continues the suspension (block 712).

In contrast, in response to the current position of the electronic device (121) being neither at the predetermined public location nor in the vicinity of the predetermined public location, the electronic device (121) cancels the suspension (block 712), and uploads the suspended still image to the server computer (201) that manages the posting of the content to the social medium, for the publication (block 714). The server computer (201) receives the still image from the electronic device (121). The server computer (201) then immediately publishes the received still image to the social medium (block 715). The server computer (201) uses posting date and time associated with the received still image, as posting date and time to be displayed when the still image is published on the server computer, and publishes the posting date and time to all users. Accordingly, the server computer (201) publishes the posting date and time indicating that the still image has been posted at 17:30 on Sep. 1, 2014 (block 716).

The user (701) has moved from Spot A to Spot B. The user (701) has shot the goal moment in the soccer game as the moving image at Spot B, using the video function of the electronic device (121). The user (701) has then entered the message "I'm watching soccer now." and posted the moving image along with the message to the social medium at 18:30 on Sep. 1, 2014 (block 717).

In response to the detection of the message and the moving image having been posted, the electronic device (121) obtains the current position of the electronic device (121), for example, using the GPS function, in order to determine whether the message and the moving image may be uploaded to the social medium for the publication. The electronic device (121) determines whether the current position of the electronic device (121) is located either at the predetermined public location or in the vicinity of the predetermined public location, based on the obtained position information. In response to the current position of the electronic device (121) being located either at the predetermined public location or in the vicinity of the predetermined public location, the electronic device (121) temporarily suspends the upload of the posted message and the posted moving image to the social medium, and stores the posted message and the posted moving image in the memory (123) or the storage medium (128) of the electronic device (121) (block 718). Accordingly, the message and the moving image posted by the user (701) are not published on the social medium in real time in response to the posting by the user (701). The electronic device (121) stores "18:30 on Sep. 1, 2014," which is the time of day of the posting by the user (701), in association with the stored message and the stored moving image.

The user (701) has finished watching the soccer game, and is moving from Spot B to Spot C (block 719). The electronic device (121) obtains the current position of the electronic device (121), for example, using the GPS function, for example, at predetermined intervals. The electronic device (121) then determines whether the current position of the electronic device (121) is located either at the predetermined public location or in the vicinity of the predetermined public location, based on the obtained position information.

In response to the current position of the electronic device (121) being either at the predetermined public location or in the vicinity of the predetermined public location, the electronic device (121) continues the suspension (block 718).

In contrast, in response to the current position of the electronic device (121) being neither at the predetermined public location nor in the vicinity of the predetermined public location, the electronic device (121) cancels the suspension (block 718), and uploads the suspended message and the suspended moving image to the server computer (201) that manages the posting of the content to the social medium, for the publication (block 720). The server computer (201) receives the message and the moving image from the electronic device (121). The server computer (201) then immediately publishes the received message and the received moving image to the social medium (block 721). The server computer (201) uses the posting date and time associated with the received message and the received moving image, as the posting date and time to be displayed when the message and the moving image are published on the server computer, and publishes the posting date and time to all users. Accordingly, the server computer (201) publishes the posting date and time indicating that the message and the moving image have been posted at 18:30 on Sep. 1, 2014 (block 722).

The user (701) has finished watching the soccer game, and has moved from Spot B to Spot C. The user (701) has entered the message "I've just arrived at Tokyo station." and posted the message to the social medium at 21:30 on Sep. 1, 2014, at Spot C (block 723). In this case, the user (701) is assumed to have selected an option "Immediately publish to friends".

In response to the detection of the message having been posted, the electronic device (121) determines whether the message may be uploaded to the social medium for the publication.

In response to the option "Immediately publish to friends" being attached to the posting, the electronic device (121) attaches information "Immediately publish to friends only" to the posted message, and uploads the message to the server computer (201) (block 724). The server computer (201) receives the message from the electronic device (121). The server computer (201) then immediately publishes the received message to the social medium, under restriction of "Immediately publish to friends only" (block 725). The server computer (201) uses the posting date and time associated with the received message, as the posting date and time to be displayed when the message is published on the server computer, and publishes the posting date and time only to friends designated by the user (701). Moreover, the server computer (201) publishes the posting date and time indicating that the message has been posted at 21:30 on Sep. 1, 2014 (block 726).

Moreover, in response to the current position of the electronic device (121) being either at the predetermined public location or in the vicinity of the predetermined public location, and the option "Immediately publish to friends" being attached to the posting, the electronic device (121) stores information on the option "Immediately publish to friends" being attached to the posted message, in the memory (123) or the storage medium (128) of the electronic device (121) (block 727). The electronic device (121) stores "21:30 on Sep. 1, 2014," which is the time of day of the posting by the user (701), in association with the stored message.

Accordingly, the message posted by the user (701) is not published to all users on the social medium in real time in response to the posting by the user (701), but is published in real time only to the friends designated by the user (701).

The user (701) is moving from Spot C to his/her home (block 728). The electronic device (121) obtains the current position of the electronic device (121), for example, using the GPS function, for example, at predetermined intervals. The electronic device (121) then determines whether the current position of the electronic device (121) is located either at the predetermined public location or in the vicinity of the predetermined public location, based on the obtained position information. In response to the current position of the electronic device (121) being either at the predetermined public location or in the vicinity of the predetermined public location, electronic device (121) continues to maintain the information on the option "Immediately publish to friends" being attached to the posted message (block 727).

The user (701) has arrived at the home. In response to his/her return to the home, the user (701) has placed the electronic device (121) in the cradle for charging (block 729).

In response to the placement in the cradle, the electronic device (121) has detected that the current position of the electronic device (121) is at the home of the user (701). The Near Field Communication (NFC) tag is provided in the cradle, and the electronic device (121) may detect that the current position of the electronic device (121) is at the home of the user (701), in response to the detection of the NFC tag. The electronic device (121) may alternatively obtain the current position of the electronic device (121), for example, using the GPS function, in response to the placement in the cradle.

In response to the current position of the electronic device (121) being at the home of the user (701) (that is, the presence of the user (701) at the home), in order to publish the message for which the publication has been restricted to the friends only (block 725), to all users, the electronic device (121) notifies the server computer (201) that manages the posting of the content to the social medium, of an instruction to publish the message to all users (block 730).

The server computer (201) receives the notification from the electronic device (121). The server computer (201) changes setting so that the message for which the publication has been restricted to the friends only (block 725) is published to all users (block 731). Accordingly, the message "I've just arrived at Tokyo station." is published to all users on the social medium.

In this way, since the still image, the message "I'm watching soccer now." and the moving image are not published in response to the user (701) being at the predetermined location or in the vicinity thereof, his/her presence at the location is unknown, and the third party can thus be prevented from barging into a location where the user (701) is. Moreover, the publication of the content can be limited to specific users in response to the user (701) being at the predetermined location or in the vicinity thereof, while the setting can be automatically changed so that the content is published to all users, in response to the user (701) leaving the predetermined location or the vicinity thereof. Accordingly, a role as a transmitter of information to an unspecified large number of people, which is one of purposes of social media, can be fulfilled. Furthermore, since the still image, the message "I'm watching soccer now." and the moving image, as well as the message "I've just arrived at Tokyo station." are published on the social medium in order of the time of day of the posting by the user (701), the posting time of day for each piece of the content cannot be out of order.

Figure 8:
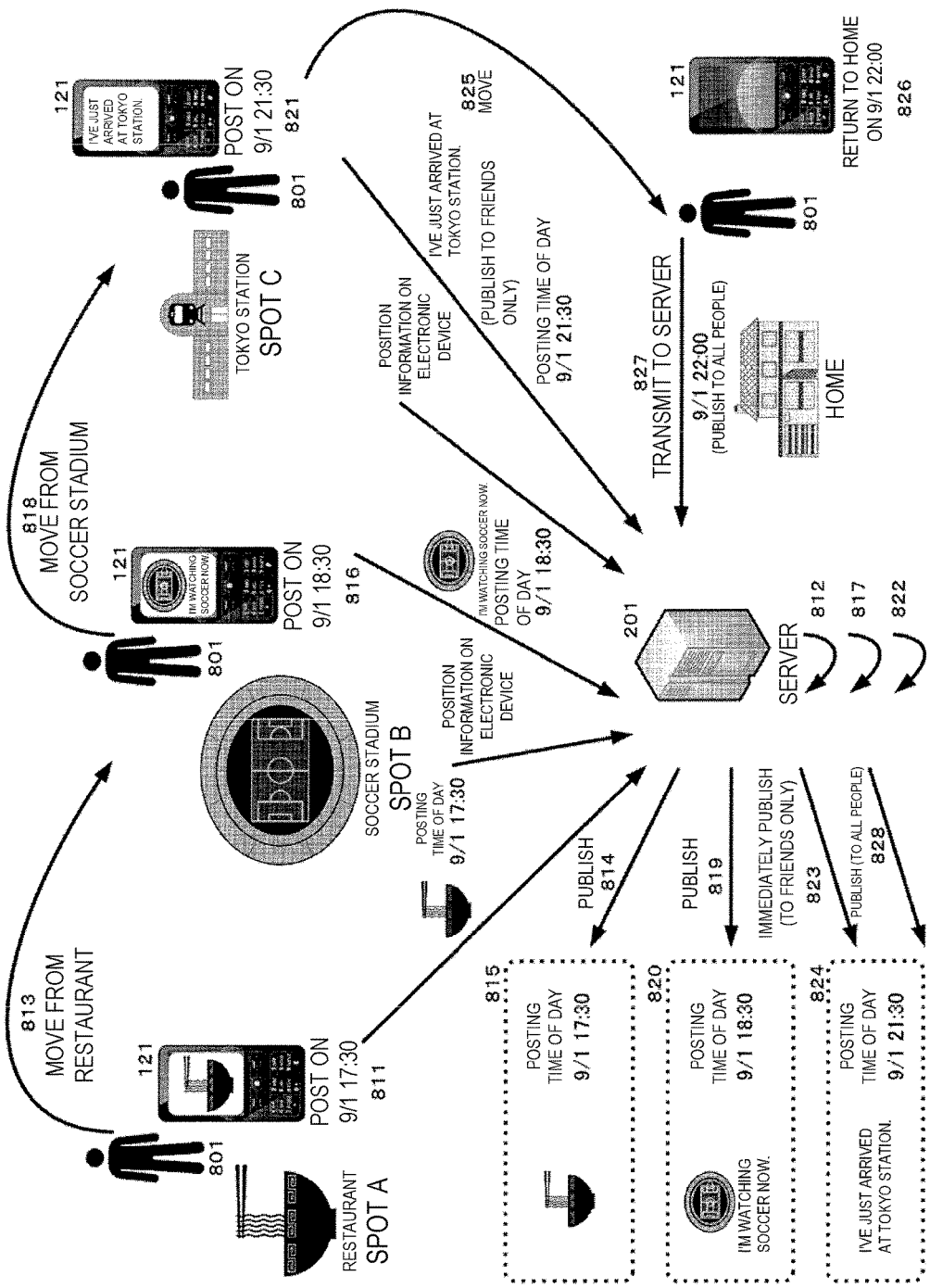
FIG. 8 is another example of the posting of content to a social medium and the publication of the content and illustrates an aspect in which the server computer determines whether the publication of the posted content is enabled, in response to the user having left the location designated by the user.

FIG. 8 is an example of the posting of the content to the social medium and the publication of the content, and illustrates an aspect in which the server computer (201) determines whether the publication of the posted content is enabled, in response to a user (801) having left a location designated by the user (801).

The user (801) is a celebrity who posts scenes of dining at restaurants to his/her blog and thereby attracts public attention. The user (801) is assumed to be carrying the electronic device (121) (for example, the tablet terminal). The user (801) is assumed to have selected a trigger option for temporarily suspending the posting of the content to the social medium if the electronic device (121) is located at a predetermined public location or in the vicinity of the public location (for example, within 15 minutes walking distance from the public location). The predetermined public location is assumed to be a restaurant, a shopping mall, a soccer stadium, or a baseball stadium, for example.

The user (801) has shot the still image of the ramen ordered at the restaurant, at Spot A, using the camera function of the electronic device (121). The user (801) has then posted the shot still image from the electronic device (121) to the social medium at 17:30 on Sep. 1, 2014 (block 811). The posting is performed through pressing the post button displayed on the screen of the electronic device (121) (the same applies to the followings).

In response to the detection of the still image having been posted, the electronic device (121) associates the still image with "17:30 on Sep. 1, 2014," which is time of day of the posting by the user (801), and uploads the still image associated with this posting time to the server computer (201) that manages the posting of the content to the social medium, for the publication (block 811).

The server computer (201) receives the still image from the electronic device (121). The server computer (201) then obtains the current position of the electronic device (121) from the electronic device (121) or from the server computer collecting the current position of the electronic device (121) (which may be the same as or different from the server computer (201)), in order to determine whether the received still image may be published to the social medium. The server computer (201) determines whether the current position of the electronic device (121) is located either at the predetermined public location or in the vicinity of the predetermined public location, based on the obtained position information. In response to the current position of the electronic device (121) being located either at the predetermined public location or in the vicinity of the predetermined public location, the server computer (201) temporarily suspends the publication of the posted still image to the social medium, and stores the posted still image in the memory (203) or the storage medium (208) of the server computer (201) (block 812). Accordingly, the still image posted by the user (801) is not published on the social medium in real time in response to the posting by the user (801).

The user (801) is moving from Spot A to Spot B (block 813). The server computer (201) obtains the current position of the electronic device (121) from the electronic device (121) or from the server computer collecting the current position of the electronic device (121) (which may be the same as or different from the server computer (201)), for example, at predetermined intervals. The server computer (201) then determines whether the current position of the electronic device (121) is located either at the predetermined public location or in the vicinity of the predetermined public location, based on the obtained position information.

In response to the current position of the electronic device (121) being located either at the predetermined public location or in the vicinity of the predetermined public location, the server computer (201) continues the suspension (block 812).

In contrast, in response to the current position of the electronic device (121) being neither at the predetermined public location nor in the vicinity of the predetermined public location, the server computer (201) cancels the suspension (block 812), and immediately publishes the suspended still image (block 814). The server computer (201) uses the posting date and time associated with the suspended still image, as the posting date and time to be displayed when the still image is published on the server computer, and publishes the posting date and time to all users. Accordingly, the server computer (201) publishes the posting date and time indicating that the still image has been posted at 17:30 on Sep. 1, 2014 (block 815).

The user (801) has moved from Spot A to Spot B. The user (801) has shot the goal moment in the soccer game as the moving image at Spot B, using the video function of the electronic device (121). The user (801) has then entered the message "I'm watching soccer now." and posted the moving image along with the message to the social medium at 18:30 on Sep. 1, 2014 (block 816).

In response to the detection of the message and the moving image having been posted, the electronic device (121) associates the message and the moving image with "18:30 on Sep. 1, 2014," which is the time of day of the posting by the user (801), and uploads the message and the moving image associated with this posting time to the server computer (201) that manages the posting of the content to the social medium, for the publication (block 816).

The server computer (201) receives the message and the moving image from the electronic device (121). The server computer (201) then obtains the current position of the electronic device (121) from the electronic device (121) or from the server computer collecting the current position of the electronic device (121) (which may be the same as or different from the server computer (201)), in order to determine whether the received message and the received moving image may be published to the social medium. The server computer (201) determines whether the current position of the electronic device (121) is located either at the predetermined public location or in the vicinity of the predetermined public location, based on the obtained position information. In response to the current position of the electronic device (121) being located either at the predetermined public location or in the vicinity of the predetermined public location, the server computer (201) temporarily suspends the publication of the posted message and the posted moving image to the social medium, and stores the posted message and the posted moving image in the memory (203) or the storage medium (208) of the server computer (201) (block 817). Accordingly, the message and the moving image posted by the user (801) are not published on the social medium in real time in response to the posting by the user (801).

The user (801) has finished watching the soccer game, and is moving from Spot B to Spot C (block 818). The server computer (201) obtains the current position of the electronic device (121) from the electronic device (121) or from the server computer collecting the current position of the electronic device (121), for example, at predetermined intervals. The server computer (201) then determines whether the current position of the electronic device (121) is located either at the predetermined public location or in the vicinity of the predetermined public location, based on the obtained position information.

In response to the current position of the electronic device (121) being located either at the predetermined public location or in the vicinity of the predetermined public location, the server computer (201) continues the suspension (block 817).

In contrast, in response to the current position of the electronic device (121) being neither at the predetermined public location nor in the vicinity of the predetermined public location, the server computer (201) cancels the suspension (block 817), and immediately publishes the suspended message and the suspended moving image (block 819). The server computer (201) uses the posting date and time associated with the suspended message and the suspended moving image, as the posting date and time to be displayed when the message and the moving image are published on the server computer, and publishes the posting date and time to all users. Accordingly, the server computer (201) publishes the posting date and time indicating that the message and the moving image have been posted at 18:30 on Sep. 1, 2014 (block 820).

The user (801) has finished watching the soccer game, and has moved from Spot B to Spot C. The user (801) has entered the message "I've just arrived at Tokyo station." and posted the message to the social medium at 21:30 on Sep. 1, 2014, at Spot C (block 821). In this case, the user (801) is assumed to have selected the option "Immediately publish to friends".

In response to the detection of the message having been posted, the electronic device (121) associates the message with "21:30 on Sep. 1, 2014," which is the time of day of the posting by the user (801), and uploads the message associated with this posting time to the server computer (201) that manages the posting of the content to the social medium, for the publication (block 821). The electronic device (121) also attaches the information "Immediately publish to friends only" to the message, and uploads the message to the server computer (201) (block 821).

The server computer (201) receives the message from the electronic device (121). In response to the option "Immediately publish to friends" being attached to the posting, the server computer (201) immediately publishes the received message to the social medium, under the restriction of "Immediately publish to friends only" (block 823). The server computer (201) uses the posting date and time associated with the received message, as the posting date and time to be displayed when the message is published on the server computer, and publishes the posting date and time only to friends designated by the user (801). Moreover, the server computer (201) publishes the posting date and time indicating that the message has been posted at 21:30 on Sep. 1, 2014 (block 824).

Moreover, in response to the option "Immediately publish to friends" being attached to the posting, the server computer (201) stores the message in the memory (203) or the storage medium (208) of the server computer (201) (block 822).

Accordingly, the message posted by the user (801) is not published to all users on the social medium in real time in response to the posting by the user (801), but is published in real time only to the friends designated by the user (801).

The user (801) is moving from Spot C to his/her home (block 825). The server computer (201) obtains the current position of the electronic device (121) from the electronic device (121) or from the server computer collecting the current position of the electronic device (121), for example, at predetermined intervals. The server computer (201) then determines whether the current position of the electronic device (121) is located either at the predetermined public location or in the vicinity of the predetermined public location, based on the obtained position information. In response to the current position of the electronic device (121) being either at the predetermined public location or in the vicinity of the predetermined public location, the server computer (201) continues the suspension (block 822).

The user (801) has arrived at the home. In response to his/her return to the home, the user (801) has placed the electronic device (121) in the cradle for charging (block 826).

In response to the placement in the cradle, the electronic device (121) has detected that the current position of the electronic device (121) is at the home of the user (801). The Near Field Communication (NFC) tag is provided in the cradle, and the electronic device (121) may detect that the current position of the electronic device (121) is at the home of the user (801), in response to the detection of the NFC tag. The electronic device (121) may alternatively obtain the current position of the electronic device (121), for example, using the GPS function, in response to the placement in the cradle.

In response to the current position of the electronic device (121) being at the home of the user (801) (that is, the presence of the user (801) at the home), in order to publish the message for which the publication has been restricted to the friends only (block 823), to all users, the electronic device (121) notifies the server computer (201) that manages the posting of the content to the social medium, of the instruction to publish the message to all users (block 827).

The server computer (201) receives the notification from the electronic device (121). The server computer (201) changes the setting so that the message for which the publication has been restricted to the friends only (block 823) is published to all users (block 828). Accordingly, the message "I've just arrived at Tokyo station." is published to all users on the social medium.

In this way, since the still image, the message "I'm watching soccer now." and the moving image are not published in response to the user (801) being at the predetermined location or in the vicinity thereof, his/her presence at the location is unknown, and the third party can thus be prevented from barging into the location where the user (801) is. Moreover, the publication of the content can be limited to the specific users in response to the user (801) being at the predetermined location or in the vicinity thereof, while the setting can be automatically changed so that the content is published to all users, in response to the user (801)

leaving the predetermined location or the vicinity thereof. Accordingly, the role as the transmitter of information to an unspecified large number of people, which is one of the purposes of the social media, can be fulfilled. Furthermore, since the still image, the message "I'm watching soccer now." and the moving image, as well as the message "I've just arrived at Tokyo station." are published on the social medium in order of the time of day of the posting by the user (801), the posting time of day for each piece of the content cannot be out of order.

Figure 9A:
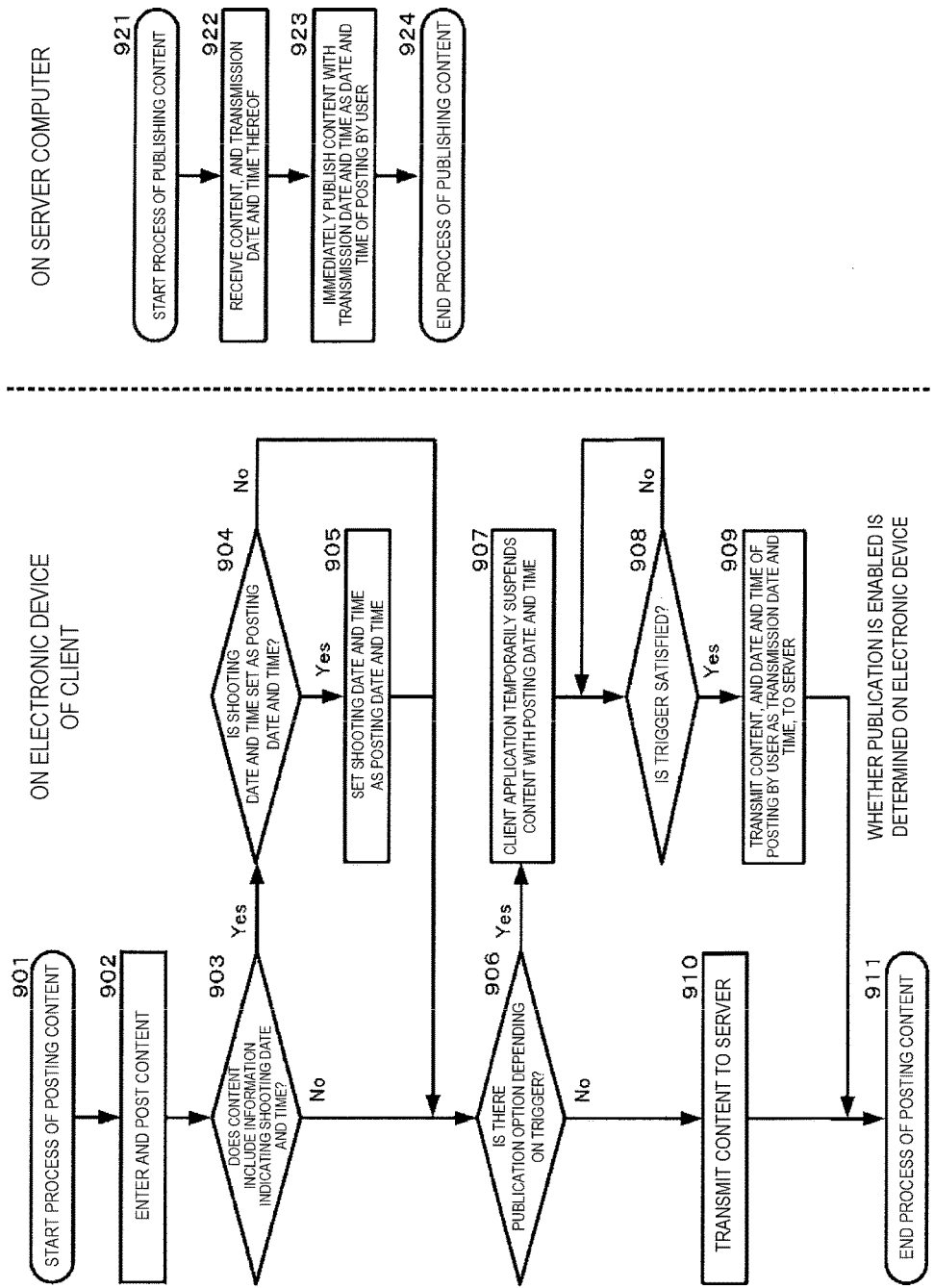
FIG. 9A is a flowchart for example processes of posting content to the social medium and publishing the content and illustrates a case where whether the publication of the posted content is enabled is determined on the electronic device.
Figure 9B:
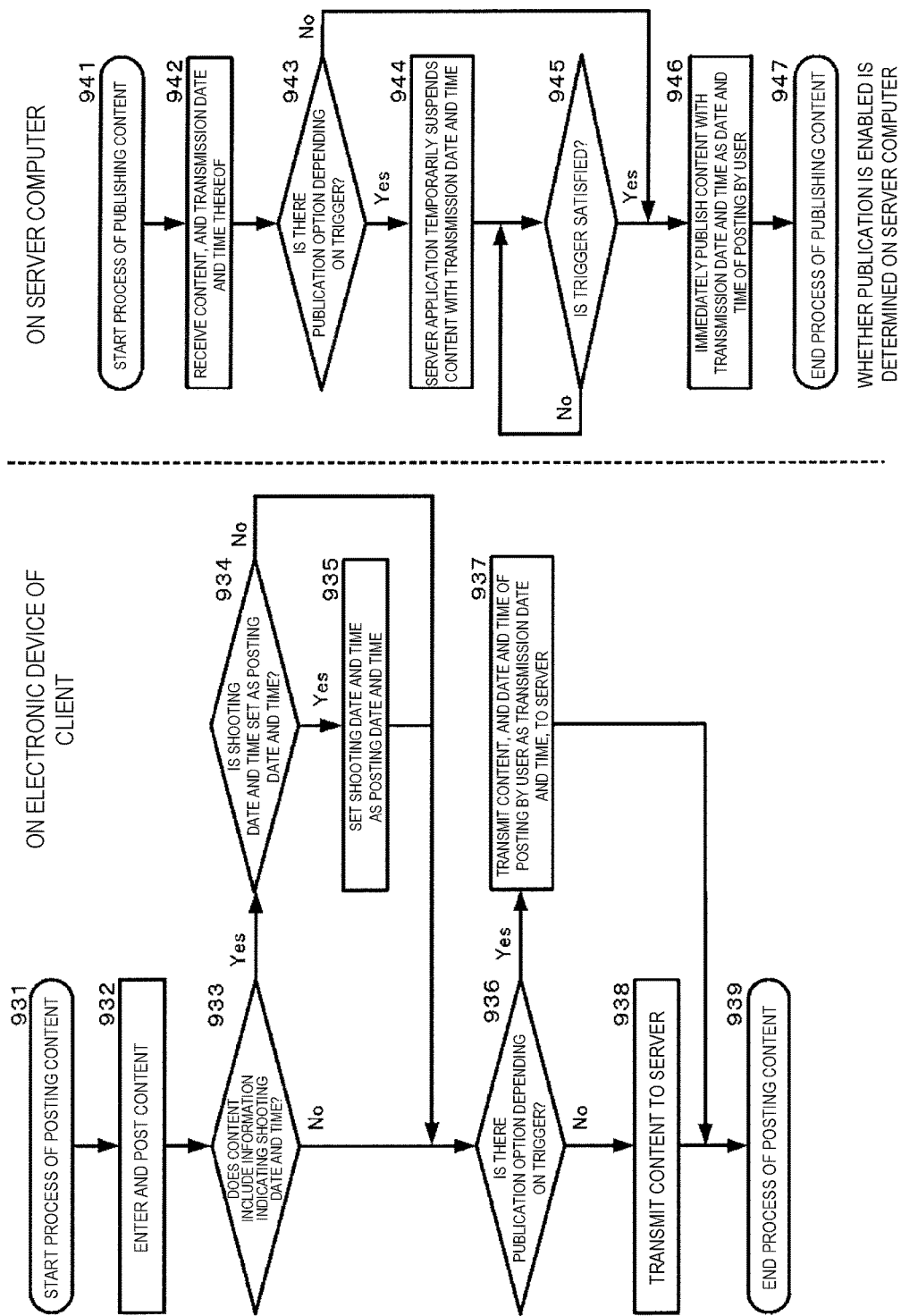
FIG. 9B is a flowchart for example processes of posting content to the social medium and publishing the content and illustrates a case where whether the publication of the posted content is enabled is determined on the server computer.

FIGS. 9A and 9B illustrate flowcharts for processes of posting the content to the social medium and publishing the content, respectively.

FIG. 9A illustrates a flowchart in the case where whether the publication is enabled is determined on the electronic device. In block 901, the electronic device (121) starts the process of posting the content to the social medium. In block 902, the electronic device (121) receives the entry of the content to be posted to the social medium, and detects the post button having been pressed by the user, in response to the end of the entry. The electronic device (121) detects that the user has posted the content to the social medium, depending on the post button having been pressed. The electronic device (121) may set date and time when the post button has been pressed (that is, the posting date and time for the content), as the posting date and time to be displayed when the content is published on the server computer.

The following blocks 903 to 905 are optional blocks. Accordingly, the electronic device (121) may advance the process from block 902 directly to block 906 without execution of the process in blocks 903 to 905.

In block 903, the electronic device (121) may determine whether the detected content includes information indicating shooting date and time. The content including the information indicating the shooting date and time may be, for example, a picture or a moving image. In response to the detected content including the information indicating the shooting date and time, the electronic device (121) advances the process to block 904. In contrast, in response to the detected content not including the information indicating the shooting date and time, the electronic device (121) advances the process to block 906.

In block 904, in response to the detected content including the information indicating the shooting date and time, the electronic device (121) queries the user whether to set the shooting date and time as the posting date and time for the content. In response to the user designating the shooting date and time as the posting date and time, the electronic device (121) advances the process to block 905. In contrast, in response to the user not designating the shooting date and time as the posting date and time, the electronic device (121) advances the process to block 906.

In block 905, in response to the user's instruction to set the shooting date and time as the posting date and time for the content, the electronic device (121) replaces the date and time of the posting of the content by the user, with the shooting date and time.

In block 906, the electronic device (121) determines whether a publication option for publication to be performed depending on a trigger has been set. The publication option for the publication to be performed depending on the trigger is information for indicating that the content is published when the trigger for performing the publication is satisfied in the case where the immediate publication of the content is not enabled. In response to the publication option having been set, the electronic device (121) advances the process to block 907. In contrast, in response to the publication option not having been set, the electronic device (121) advances the process to block 910.

In block 907, in the electronic device (121), in response to the publication option having been set, a client application of the electronic device (121) does not transmit the content to the server computer (201) that manages the posting to the social medium, but stores the content in the memory (123) or the storage medium (128) (both of which act as buffers) of the electronic device (121), and temporarily suspends the transmission. The electronic device (121) associates the content with the posting date and time when the user has pressed the post button in block 902, and saves the content in the memory (123) or the storage medium (128).

In block 908, the electronic device (121) determines whether a trigger for transmitting the content, for which the transmission has been temporarily suspended, to the server computer (201) is satisfied.

The electronic device (121) may set each of events listed in the following (1) to (9), for example, as the trigger, and may determine that the publication of the content is enabled, when the event is satisfied.

(1) Trigger 1: the user has arrived at a location designated by the user or the vicinity of the designated location. The designated location may be, for example, the user's home or the user's office (particularly, a small office or a private office). The arrival at the location designated by the user is, for example, the user's arrival at the home if a predetermined location is the user's home; or the user's return to the office if the predetermined location is the user's office (for example, an office managed by the user, or an office that the user belongs to). An object of this trigger may be to enable reduced risk of encountering damage, such as sneak thievery, which may be caused due to the user's absence from the designated location.

(2) Trigger 2: the user has left the location designated by the user or the vicinity of the designated location. The designated location may be, for example, a public location. The public location is, for example, but not limited to, a restaurant, a shopping mall, and a sports stadium (for example, a soccer stadium, or a baseball stadium). An object of this trigger may be to enable prevention of occurrence of confusion even if a third party having read the content barges into the location where the user was, since the user is already absent from the location.

(3) Trigger 3: the user is absent from the location designated by the user or the vicinity of the designated location. The same object as stated in the Trigger 1 may be accomplished.

(4) Trigger 4: time until the user arrives at the location designated by the user from the current position has been predicted, and the predicted time has elapsed. The same object as stated in the Trigger 1 may be accomplished.

(5) Trigger 5: time until the user leaves the current position has been read from an electronic schedule, and the time has elapsed. The same object as stated in the Trigger 2 may be accomplished.

(6) Trigger 6: the time until the user leaves the current position has been predicted, and the predicted time has elapsed. The same object as stated in the Trigger 2 may be accomplished.

(7) Trigger 7: a certain time has elapsed. The same object as stated in the Trigger 1, or as stated in the Trigger 2 is accomplished. The certain time may be, for example, average time until the arrival at the designated location or the vicinity of the designated location, in order to accomplish the same object as stated in the Trigger 1. The certain time may be, for example, time until the user moves sufficiently away from the designated location or the vicinity of the designated location, in order to accomplish the same object as stated in the Trigger 2.

(8) Trigger 8: a party other than the user has arrived at the location designated by the user or the vicinity of the designated location. The same object as stated in the Trigger 1 may be accomplished. The party other than the user may be, for example, a family member of the user (particularly, an adult male, for example) if the predetermined location is the user's home; or an employee of the office if the predetermined location is the user's office (for example, the office managed by the user, or the office that the user belongs to).

(9) Trigger 9: the party other than the user is at the location designated by the user. The same object as stated in the Trigger 1 may be accomplished. The party other than the user has been described above.

Moreover, in block 908, if the current position information on the electronic device (121) is required to determine whether the trigger is satisfied, the electronic device (121) obtains the current position of the electronic device (121), using an approach for obtaining the position information. The electronic device (121) may arbitrarily use an approach for obtaining the position information according to GPS, a method of obtaining the position information through an access point for Wi-Fi or the like, a method of obtaining the position information through a mobile telephone base station (also referred to as "cell-ID method"), or a combination thereof, for example, as the approach for obtaining the position information.

Moreover, in block 908, if the user's schedule data is required to determine whether the trigger is satisfied, the electronic device (121) may read the user's schedule from, for example, the electronic schedule, for example, the schedule management app or agenda software. Data of the electronic schedule may be located in the electronic device (121), or may be located in a network storage medium accessible by the electronic device (121) or in a server computer that manages the electronic schedule data.

In block 908, in response to the trigger being satisfied, the electronic device (121) advances the process to block 909. In contrast, in response to the trigger not being satisfied, the electronic device (121) repeats the determination block in block 908 until the trigger is satisfied.

Moreover, in block 908, the electronic device (121) may optionally determine whether the immediate publication of the posted content to some of the users of the social medium is enabled, and in response to the immediate publication of the posted content to the some of the users being enabled, the electronic device (121) may attach information allowing the immediate publication to the some of the users, to the posted content, and transmit the posted content with the information to the server computer (201). The information allowing the immediate publication may be, for example, a flag or a tag.

In block 909, in response to the trigger being satisfied, the electronic device (121) transmits the posting date and time when the content has been posted by the user (which will have a time lag from transmission date and time, due to the temporary suspension in block 907), as the transmission date and time, along with the content to the server computer (201).

In block 910, in the electronic device (121), in response to the publication option, which is for the publication to be performed depending on the trigger, not having been set, the client application of the electronic device (121) immediately transmits the transmission date and time (which is the same or substantially the same as the posting date and time when the content has been posted by the user), along with the content to the server computer (201).

In block 911, the electronic device (121) ends the process of posting the content. In block 921, the server computer (201) starts the process of publishing the content.

In block 922, the server computer (201) receives the content and the transmission date and time for the content, which have been transmitted from the electronic device (121). If the content is the content transmitted from the electronic device (121) in block 909, the transmission date and time is the posting date and time when the content has been posted by the user. If the content is the content transmitted from the electronic device (121) in block 910, the transmission date and time is the transmission date and time when the electronic device (121) has transmitted the content.

In block 923, in response to receiving the content in block 922, the server computer (201) publishes the content transmitted from the electronic device (121), to the social medium. The posting date and time to be displayed when the content is published on the server computer (201) is the posting date and time of the posting by the user, if the content is the content transmitted from the electronic device (121) in block 909 (accordingly, the transmission date and time that is used as the posting date and time to be displayed when the content is published on the server computer (201) is date and time prior to transmission date and time when the electronic device (121) has actually transmitted the content to the server computer (201)). Moreover, the posting date and time to be displayed when the content is published on the server computer (201) is the transmission date and time when the content has been actually transmitted from the electronic device (121), if the content is the content transmitted from the electronic device (121) in block 910 (accordingly, the posting date and time to be displayed when the content is published on the server computer (201) is the same or substantially the same as the transmission date and time when the electronic device (121) has actually transmitted the content to the server computer (201)).

Moreover, in block 923, if the information allowing the immediate publication to some of the users of the social medium has been attached to the content received in block 922, the server computer (201) may optionally allow the immediate publication of the content only to some of the users, and immediately publish the content.

In block 924, the server computer (201) ends the process of publishing the content.

FIG. 9B illustrates a flowchart in the case where whether the publication is enabled is determined on the server computer. In block 931, the electronic device (121) starts the process of posting the content to the social medium.

Each process in blocks 932 to 935 is the same as each process in blocks 902 to 905 illustrated in FIG. 9A. Accordingly, for content of each of blocks 932 to 935, the above description about each of blocks 902 to 905 illustrated in FIG. 9A should be referred to.

In block 936, the electronic device (121) determines whether the publication option has been set, which is for the publication to be performed depending on the trigger for performing the publication in the case where the immediate publication of the content is not enabled. In response to the publication option having been set, the electronic device (121) advances the process to block 937. In contrast, in response to the publication option not having been set, the electronic device (121) advances the process to block 938.

In block 937, in response to the publication option having been set, the electronic device (121) immediately transmits the posting date and time when the content has been posted by the user, as the transmission date and time, along with the content to the server computer (201). The electronic device (121) also transmits information indicating that the content has the publication option for the publication to be performed depending on the trigger, along with the content to the server computer (201).

Moreover, in block 937, the electronic device (121) may optionally determine whether the immediate publication of the posted content to some of the users of the social medium is enabled, and in response to the immediate publication of the posted content to some of the users being enabled, the electronic device (121) may attach the information allowing the immediate publication to some of the users, to the posted content, and transmit the posted content with the information to the server computer (201). The information allowing the immediate publication may be, for example, a flag or a tag.

In block 938, in response to the publication option, which is for the publication to be performed depending on the trigger, not having been set, the electronic device (121) immediately transmits the transmission date and time (which is the same or substantially the same as the posting date and time when the content has been posted by the user), along with the content to the server computer (201).

In block 939, the electronic device (121) ends the process of posting the content. In block 941, the server computer (201) starts the process of publishing the content.

In block 942, the server computer (201) receives the content and the transmission date and time for the content, which have been transmitted from the electronic device (121). Moreover, if the content is the content transmitted from the electronic device (121) in block 937, the server computer (201) receives the information transmitted in block 937, that is, the information indicating that the content has the publication option for the publication to be performed depending on the trigger, along with the content. If the received content is the content transmitted from the electronic device (121) in block 937, the transmission date and time is the posting date and time when the content has been posted by the user. If the received content is the content transmitted from the electronic device (121) in block 938, the transmission date and time is the transmission date and time when the electronic device (121) has transmitted the content.

In block 943, the server computer (201) determines whether the publication option has been set, which is for the publication to be performed depending on the trigger for performing the publication in the case where the immediate publication of the content is not enabled. In response to the publication option having been set, the server computer (201) advances the process to block 944. In contrast, in response to the publication option not having been set, the server computer (201) advances the process to block 946.

In block 944, in the server computer (201), in response to the publication option having been set, a server application of the server computer (201) does not immediately publish the content, but stores the content in the memory (203) or the storage medium (208) (both of which act as buffers) of the server computer (201), and temporarily suspends the publication.

In block 945, the server computer (201) determines whether a trigger for publishing the content, for which the publication has been temporarily suspended, is satisfied.

The server computer (201) may set each of the events listed in (1) to (9) set forth in block 908 of FIG. 9A, for example, as the trigger, and may determine that the publication of the content is enabled, when the event is satisfied.

Moreover, in block 945, if the current position information on the electronic device (121) is required to determine whether the trigger is satisfied, the server computer (201) obtains the current position of the electronic device (121) from the electronic device (121) or from the server computer collecting the current position of the electronic device (121), for example, at predetermined intervals.

Moreover, in block 945, if the user's schedule data is required to determine whether the trigger is satisfied, the server computer (201) may read the user's schedule from, for example, the electronic schedule, for example, the schedule management app or the agenda software, which is associated with the user. The electronic schedule data may be located in the electronic device (121), or may be located in the network storage medium accessible by the electronic device (121) or in the server computer that manages the electronic schedule data (which may be the same as or different from the server computer (201)).

In block 945, in response to the trigger being satisfied, the server computer (201) advances the process to block 946. In contrast, in response to the trigger not being satisfied, the server computer (201) repeats the determination block in block 945 until the trigger is satisfied.

In block 946, the server computer (201) publishes the content to the social medium with the transmission date and time as the date and time of the posting by the user. The posting date and time to be displayed when the content is published on the server computer (201) is the posting date and time of the posting by the user, if the content is the content transmitted from the electronic device (121) via block 937 (accordingly, the transmission date and time that is used as the posting date and time to be displayed when the content is published on the server computer (201) is the date and time prior to the transmission date and time when the electronic device (121) has actually transmitted the content to the server computer (201)). Moreover, the posting date and time to be displayed when the content is published on the server computer (201) is the transmission date and time when the content has been actually transmitted from the electronic device (121), if the content is the content transmitted from the electronic device (121) via block 938 (accordingly, the transmission date and time that is used as the posting date and time to be displayed when the content is published on the server computer (201) is the same or substantially the same as the transmission date and time when the electronic device (121) has actually transmitted the content to the server computer (201)).

Moreover, in block 946, if the information allowing the immediate publication to some of the users of the social medium has been attached to the content received in block 942, the server computer (201) may optionally allow the immediate publication of the content only to some of the users, and immediately publish the content.

Figure 10:
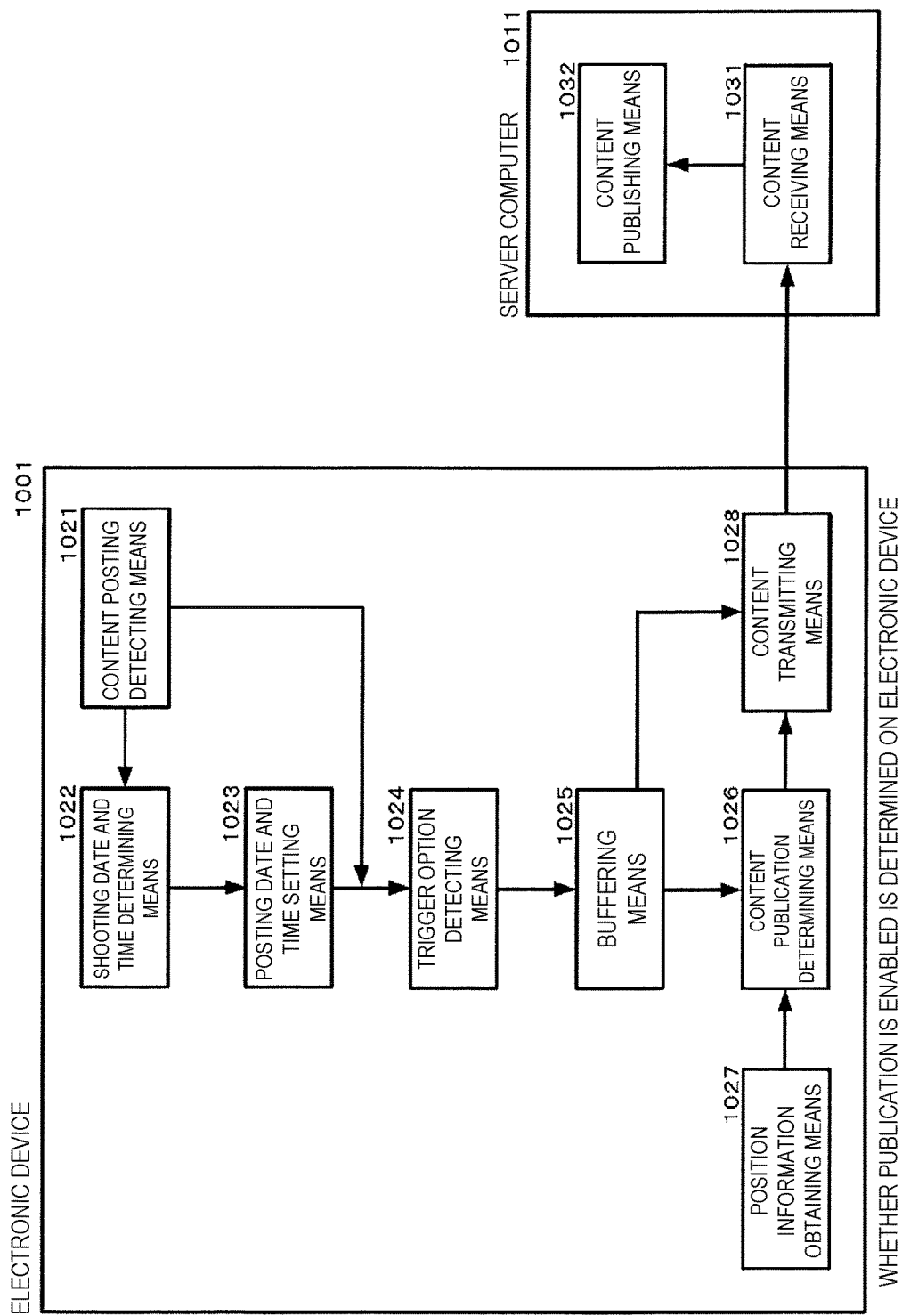
FIG. 10 is a diagram illustrating an example of a functional block diagram of one embodiment of an electronic device and, FIG. 11 is a diagram illustrating an example of a functional block diagram of another embodiment of an electronic device.

In block 947, the server computer (201) ends the process of publishing the content. FIG. 10 is a diagram illustrating an example of a functional block diagram of an electronic device (1001) that includes a hardware configuration according to FIG. 1A or 1B, and that is according to the third aspect of the disclosure, as well as a functional block diagram of a server computer (1011) that includes a hardware configuration according to FIG. 2, and that may be used in each of the third and first aspects of the disclosure.

The electronic device (1001) executes the process of posting the content to the social medium, and may be, for example, the electronic device (101) illustrated in FIG. 1A or the electronic device (121) illustrated in FIG. 1B.

The electronic device (1001) includes content posting detecting means (1021), shooting date and time determining means (1022), posting date and time setting means (1023), trigger option detecting means (1024), buffering means (1025), content publication determining means (1026), position information obtaining means (1027), and content transmitting means (1028).

The content posting detecting means (1021) detects the posting of the content to the social medium by the user. The content posting detecting means (1021) may also execute block 902 described in FIG. 9A.

The shooting date and time determining means (1022) determines whether the content (for example, a picture or a moving image) detected by the content posting detecting means (1021) includes information indicating the shooting date and time.

The shooting date and time determining means (1022) may also execute block 903 described in FIG. 9A.

In response to the content detected by the content posting detecting means (1021) including the information indicating the shooting date and time, the posting date and time setting means (1023) queries the user whether to set the shooting date and time as the posting date and time for the content. Moreover, in response to the user's instruction to set the shooting date and time as the posting date and time for the content, the posting date and time setting means (1023) replaces the date and time of the posting of the content by the user, with the shooting date and time.

The posting date and time setting means (1023) may also execute blocks 904 and 905 described in FIG. 9A. The trigger option detecting means (1024) determines whether the publication option for the publication to be performed depending on the trigger has been set.

Moreover, in response to the publication option, which is for the publication to be performed depending on the trigger, having been set, the trigger option detecting means (1024) stores the content in the buffering means (1025), and temporarily suspends the transmission of the content.

The trigger option detecting means (1024) may also execute blocks 906 and 907 described in FIG. 9A.

In response to the immediate publication of the content detected by the content posting detecting means (1021) not being enabled, the buffering means (1025) temporarily stores the content. The buffering means (1025) may be, for example, a memory or a storage medium of the electronic device (1001).

Moreover, the buffering means (1025) is used in block 907 described in FIG. 9A.

In response to the trigger option detecting means (1024) detecting that the trigger option has been set to the content, the content publication determining means (1026) determines whether the publication of the posted content is enabled.

Moreover, the content publication determining means (1026) sets each of the events listed in the (1) to (9) set forth in the description of block 908 of FIG. 9A, for example, as the trigger, and determines that the publication of the content is enabled, when the event is satisfied.

Moreover, in response to the publication of the posted content not being enabled, the content publication determining means (1026) may repeatedly determine whether the publication of the posted content is enabled. The repeat may be executed at predetermined intervals, or depending on some sort of trigger. The trigger may be, for example, posting of new content, change of a base station in communication with the electronic device (1001), and a specific action performed by the user.

Moreover, the content publication determining means (1026) may obtain position information on the electronic device (1001) from the position information obtaining means (1027).

The content publication determining means (1026) may also execute block 908 described in FIG. 9A.

The position information obtaining means (1027) obtains a current position of the electronic device (1001). The approach for obtaining the position information is as set forth in the description of block 908 of FIG. 9A.

Moreover, the position information obtaining means (1027) is used to obtain the current position of the electronic device (1001) in block 908 described in FIG. 9A.

In response to the content publication determining means (1026) having determined that the publication of the posted content is enabled, the content transmitting means (1028) transmits the posted content to the server computer. In response to the trigger being satisfied, the content transmitting means (1028) transmits the posting date and time when the content has been posted by the user (which will have the time lag from the transmission date and time, due to the temporary suspension in block 907), as the transmission date and time, along with the content to the server computer (1011).

Moreover, the content transmitting means (1028) may transmit the date and time when the posted content has been posted by the user, along with the posted content.

The content transmitting means (1028) may also execute blocks 909 and 910 described in FIG. 9A.

The server computer (1011) executes the process of publishing the content to the social medium, and may be, for example, the server computer (201) illustrated in FIG. 2.

The server computer (1011) includes content receiving means (1031) and content publishing means (1032).

The content receiving means (1031) receives the content and the transmission date and time for the content, which have been transmitted from the content transmitting means (1028) of the electronic device (1001).

The content receiving means (1031) may also execute block 922 described in FIG. 9A. The content publishing means (1032) immediately publishes the content received by the content receiving means (1031), to the social medium. The content publishing means (1032) may also execute block 923 described in FIG. 9A.

Figure 11:
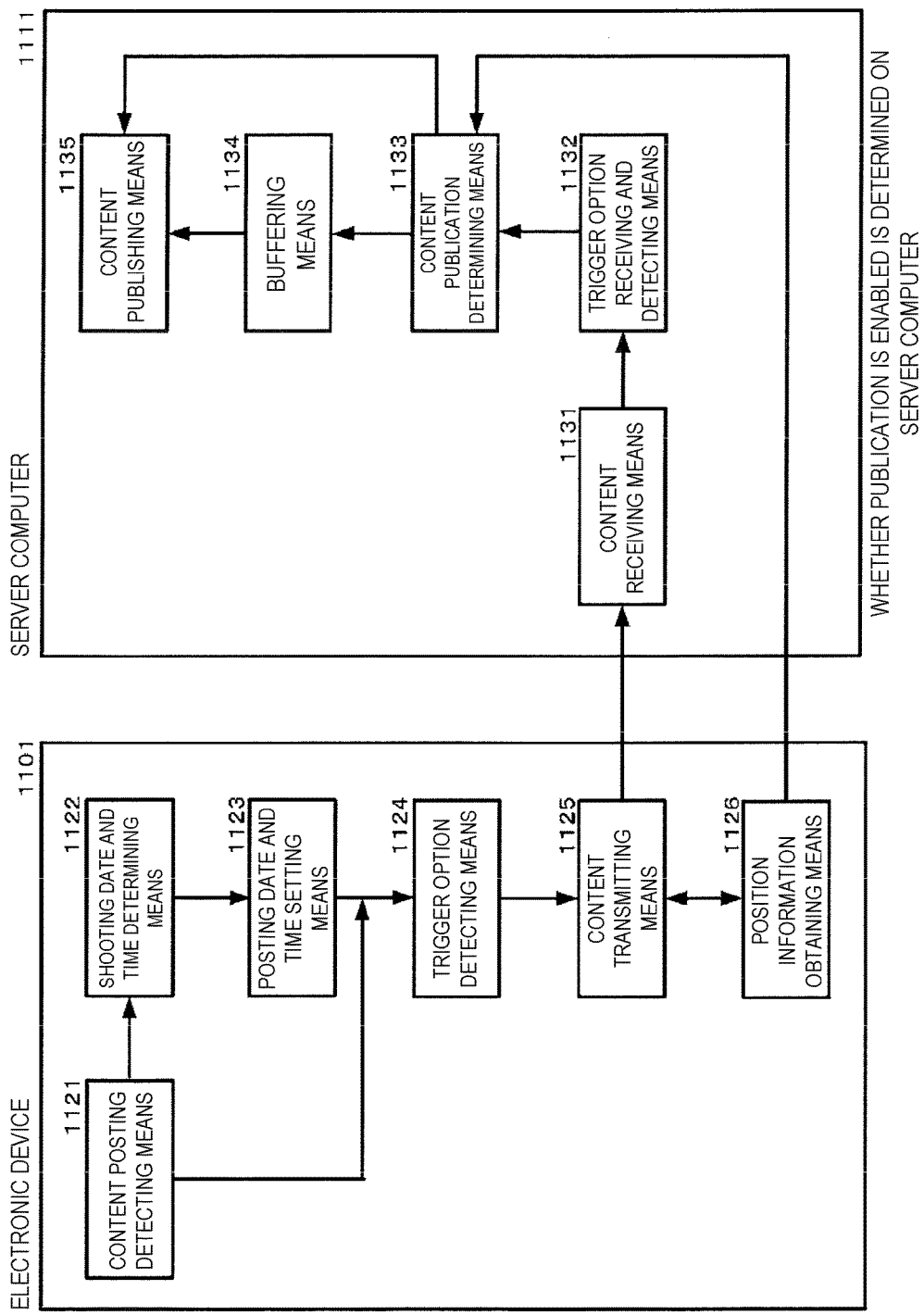

FIG. 11 is a diagram illustrating an example of a functional block diagram of an electronic device (1101) that includes the hardware configuration according to FIG. 1A or 1B, and that may be used in the second or fourth aspects of the disclosure, as well as a functional block diagram of a server computer (1011) that includes the hardware configuration according to FIG. 2, and that is according to the fourth aspect of the disclosure or may be used in the second aspect of the disclosure.

The electronic device (1101) executes the process of posting the content to the social medium, and may be, for example, the electronic device (1101) illustrated in FIG. 1A or the electronic device (121) illustrated in FIG. 1B.

The electronic device (1101) includes content posting detecting means (1121), shooting date and time determining means (1122), posting date and time setting means (1123), trigger option detecting means (1124), content transmitting means (1125), and position information obtaining means (1126).

The content posting detecting means (1121) detects the posting of the content to the social medium by the user. The content posting detecting means (1121) may also execute block 932 described in FIG. 9B.

The shooting date and time determining means (1122) determines whether the content (for example, a picture or a moving image) detected by the content posting detecting means (1121) includes information indicating the shooting date and time.

The shooting date and time determining means (1122) may also execute block 933 described in FIG. 9B. In response to the content detected by the content posting detecting means (1121) including the information indicating the shooting date and time, the posting date and time setting means (1123) queries the user whether to set the shooting date and time as the posting date and time for the content. Moreover, in response to the user's instruction to set the shooting date and time as the posting date and time for the content, the posting date and time setting means (1123) replaces the date and time of the posting of the content by the user, with the shooting date and time.

The posting date and time setting means (1123) may also execute block 934 described in FIG. 9B. The trigger option detecting means (1124) determines whether the publication option for the publication to be performed depending on the trigger has been set.

The trigger option detecting means (1124) may also execute block 936 described in FIG. 9B. The content transmitting means (1125) transmits the posted content to the server computer. The content transmitting means (1125) may also execute blocks 937 and 938 described in FIG. 9B. The position information obtaining means (1126) obtains a current position of the electronic device (1101), in response to a request for provision of the current position, from the server computer (1011), or at predetermined intervals. The approach for obtaining the position information is as set forth in the description of block 908 of FIG. 9A.

Moreover, the position information obtained by the position information obtaining means (1126) may be used in content publication determining means (1133) of the server computer (1011).

The server computer (1111) executes the process of publishing the content to the social medium, and may be, for example, the server computer (201) illustrated in FIG. 2.

The server computer (1111) includes content receiving means (1131), trigger option receiving and detecting means (1132), the content publication determining means (1133), buffering means (1134), and content publishing means (1135).

The content receiving means (1131) receives the content posted by the user, from the content transmitting means (1125) of the electronic device (1101).

Moreover, the content receiving means (1131) receives the posting date and time when the posted content has been posted by the user, along with the posted content.

The content receiving means (1131) may also execute block 942 described in FIG. 9B. The trigger option receiving and detecting means (1132) determines whether the publication option for the publication to be performed depending on the trigger has been set to the content received by the content receiving means (1131).

Moreover, in response to the publication option, which is for the publication to be performed depending on the trigger, having been set, the trigger option receiving and detecting means (1132) stores the content in the buffering means (1134), and temporarily suspends the publication of the content.

The trigger option receiving and detecting means (1132) may also execute blocks 943 and 944 described in FIG. 9B. In response to the immediate publication of the content received by the content receiving means (1131) not being enabled, the buffering means (1134) temporarily stores the received content. The buffering means (1134) may be, for example, a memory or a storage medium of the server computer (1011).

Moreover, the buffering means (1134) is used in block 944 described in FIG. 9B. The content publication determining means (1133) determines whether the publication of the content received by the content receiving means (1131) is enabled.

Moreover, the content publication determining means (1133) sets each of the events listed in (1) to (9) set forth in the description of block 945 of FIG. 9B, for example, as the trigger, and determines that the publication of the content is enabled, when the event is satisfied.

Moreover, in response to the publication of the received content not being enabled, the content publication determining means (1133) may repeatedly determine whether the publication of the posted content is enabled. The repeat may be executed at predetermined intervals, or depending on some sort of trigger. The trigger may be, for example, reception of posting of new content from the electronic device (1101), change of a base station in communication with the electronic device (1101), and reception of the specific action by the user.

Moreover, the content publication determining means (1133) may receive the position information on the electronic device (1101) from the position information obtaining means (1126) of the electronic device (1101), or may obtain the position information on the electronic device (1101) from another server computer collecting the current position of the electronic device (1101).

The content publication determining means (1133) may also execute block 945 described in FIG. 9B. In response to the publication of the content received by the content receiving means (1131) having been enabled, the content publishing means (1135) publishes the received content.

Moreover, if the content received by the content receiving means (1131) includes the information indicating the shooting date and time for the content, the content publishing means (1135) sets the posting date and time to be displayed when the content received by the content receiving means (1131) is published on the server computer (1011), so as to be the shooting date and time.

The content publishing means (1135) may also execute block 946 described in FIG. 9B.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of posting content to a social medium, the method comprising:
receiving content posted by a user along with an associated posting time that indicates when the user selected an option to post the content to the social medium;
determining that publication of the content posted by the user is dependent on a trigger, wherein the trigger relates to both a predetermined location and either the user or a party associated with the user;
in response to determining that publication of the content is dependent on the trigger, storing the content with the associated posting time, and indefinitely suspending publication of the content pending a determination that the trigger is satisfied; and
publishing the content at a publication time in response to determining that the trigger is satisfied, wherein the content is published such that the associated posting time is published with the content to indicate a time prior to the publication time.

2. The method of claim 1, wherein indefinitely suspending publication of the content comprises:

storing the content and posting time in a memory of the electronic device;

indefinitely suspending transmission of the content from the electronic device to the server;

determining that the trigger has been satisfied at the electronic device; and in response to determining that the trigger has been satisfied, transmitting the content and the posting time from the electronic device to the server for publication.

3. The method of claim 1, wherein indefinitely suspending publication of the content comprises:

receiving the content and the posting time transmitted from the electronic device to the server for publication;

storing the content and posting time in a memory at the server;

determining that the trigger has been satisfied at the server; and in response to determining that the trigger has been satisfied, publishing the content and the posting time at the server.

4. The method of claim 1, wherein the trigger is one of:

the user having left the predetermined location that is designated by the user;

arrival of the user at a vicinity of the predetermined location;

absence of the user from the predetermined location designated by the user; or absence of the user from the vicinity of the predetermined location.

5. The method of claim 1, wherein the trigger is one of:

an elapse of a predicted time until the user arrives at the predetermined location designated by the user from a current position;

an elapse of time indicated in a schedule until the user leaves the current position;

an elapse of a predicted time until the user leaves the current position; or an elapse of a predetermined time.

6. The method of claim 1, wherein the trigger is a presence of the party other than the user at the predetermined location that is designated by the user.

7. The method of claim 1, further comprising:

determining whether publication of the posted content to a subset of users of the social medium is enabled; and in response to publication of the posted content to the subset of users being enabled, attaching to the posted content information allowing the publication to the subset of the users and transmitting the posted content with the information to the server.

8. The method of claim 1, wherein the trigger is an arrival of the user or the party other than the user at the predetermined location designated by the user or a vicinity of the predetermined location.

* * * * *